(12) United States Patent
Samler et al.

(10) Patent No.: US 8,812,387 B1
(45) Date of Patent: Aug. 19, 2014

(54) SYSTEM AND METHOD FOR IDENTIFYING RELATED CREDIT INQUIRIES

(71) Applicant: CSIdentity Corporation, Austin, TX (US)

(72) Inventors: Steven E. Samler, Andover, MA (US); Matthew Hall, San Luis Obispo, CA (US)

(73) Assignee: Csidentity Corporation, Austin, TX (US)

( * ) Notice: Subject to any disclaimer, the term of this patent is extended or adjusted under 35 U.S.C. 154(b) by 0 days.

(21) Appl. No.: 13/828,566

(22) Filed: Mar. 14, 2013

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS

| | | | | |
|---|---|---|---|---|
| 5,819,260 | A * | 10/1998 | Lu et al. | 707/700 |
| 7,542,993 | B2 | 6/2009 | Satterfield et al. | |
| 1,026,083 | A1 | 10/2011 | Ross et al. | |
| 8,285,613 | B1 * | 10/2012 | Coulter | 705/35 |
| 8,359,278 | B2 | 1/2013 | Domenikos et al. | |
| 2004/0199456 | A1 * | 10/2004 | Flint et al. | 705/38 |
| 2006/0212386 | A1 * | 9/2006 | Willey et al. | 705/38 |
| 2007/0208669 | A1 * | 9/2007 | Rivette et al. | 705/59 |
| 2008/0010203 | A1 * | 1/2008 | Grant | 705/44 |
| 2008/0063172 | A1 * | 3/2008 | Ahuja et al. | 379/201.07 |
| 2009/0048957 | A1 * | 2/2009 | Celano | 705/35 |
| 2009/0125463 | A1 | 5/2009 | Hido | |
| 2010/0293090 | A1 | 11/2010 | Domenikos et al. | |
| 2012/0066073 | A1 * | 3/2012 | Dilip et al. | 705/14.66 |
| 2012/0215758 | A1 | 8/2012 | Gottschalk, Jr. et al. | |
| 2012/0278227 | A1 | 11/2012 | Kolo et al. | |

FOREIGN PATENT DOCUMENTS

KR 20040034063 4/2004

OTHER PUBLICATIONS

Experian Team, "Impact on credit scores of inquiries for an auto loan", Ask Experian, Mar. 1, 2009.*

* cited by examiner

*Primary Examiner* — Eric T Wong
(74) *Attorney, Agent, or Firm* — Winstead PC

(57) ABSTRACT

In one embodiment, a method includes receiving a credit inquiry for a monitored consumer. The method further includes performing at least one credit-inquiry analysis on the credit inquiry. The performing yields at least one of a matched creditor from master creditor records and an inferred credit category based on a lexical analysis. In addition, the method includes, responsive to the performing, determining whether the credit inquiry is related to a previous credit inquiry for the monitored consumer. Further, the method includes, responsive to a determination that the credit inquiry is related to a previous credit inquiry, suppressing a credit alert to the monitored consumer.

24 Claims, 11 Drawing Sheets

SYSTEM AND METHOD FOR IDENTIFYING RELATED CREDIT INQUIRIES

BACKGROUND

1. Technical Field

The present invention relates generally to data analysis and more particularly, but not by way of limitation, to systems and methods for identifying related credit inquiries.

2. History Of Related Art

Identity theft is one of the fastest-growing crimes in the United States and worldwide. Identity theft generally involves a use of personally-identifying information (PII) that is not authorized by an owner of the PII. PII, as used herein, refers to information that can be used to uniquely identify, contact, or locate a person or can be used with other sources to uniquely identify, contact, or locate a person. PII may include, but is not limited to, social security numbers (SSN), bank or credit card account numbers, passwords, birth dates, and addresses. Identity theft may include, for example, an unauthorized change to PII or an unauthorized use of PII to access resources or to obtain credit or other benefits.

Since identity theft affects both businesses and consumers, there is a need to effectively alert consumers of potential identity theft. Part of an effective alert system can be notifying consumers of new credit inquiries using their PII. In that regard, various credit-monitoring services generate and present alerts to monitored consumers as new credit inquiries appear on their credit report. However, in jurisdictions such as the United States, distinct credit reports are maintained by multiple credit bureaus. Therefore, when the monitored consumer begins shopping for a car loan, home mortgage, credit card, or the like, multiple credit inquiries may be initiated by multiple creditors relative to multiple credit reports. This can result in voluminous credit alerts being generated and presented to the monitored consumer even though the alerts may relate to a single prospective transaction. The volume of redundant information can reduce the effectiveness of credit monitoring, for example, by training consumers to ignore alerts or by discouraging them from monitoring their credit at all.

SUMMARY OF THE INVENTION

In one embodiment, a method includes, on a computer system comprising at least one processor and memory, receiving a credit inquiry for a monitored consumer. The method further includes performing, by the computer system, at least one credit-inquiry analysis on the credit inquiry. The performing yields at least one of a matched creditor from master creditor records and an inferred credit category based on a lexical analysis. In addition, the method includes, responsive to the performing, the computer system determining whether the credit inquiry is related to a previous credit inquiry for the monitored consumer. Further, the method includes, responsive to a determination that the credit inquiry is related to a previous credit inquiry, the computer system suppressing a credit alert to the monitored consumer.

In one embodiment, a system includes at least one processor operable to implement a method. The method includes receiving a credit inquiry for a monitored consumer. The method further includes performing at least one credit-inquiry analysis on the credit inquiry. The performing yields at least one of a matched creditor from master creditor records and an inferred credit category based on a lexical analysis. In addition, the method includes, responsive to the performing, determining whether the credit inquiry is related to a previous credit inquiry for the monitored consumer. Further, the method includes, responsive to a determination that the credit inquiry is related to a previous credit inquiry, suppressing a credit alert to the monitored consumer.

In one embodiment, a computer-program product includes a computer-usable medium having computer-readable program code embodied therein. The computer-readable program code adapted to be executed to implement a method. The method includes receiving a credit inquiry for a monitored consumer. The method further includes performing at least one credit-inquiry analysis on the credit inquiry. The performing yields at least one of a matched creditor from master creditor records and an inferred credit category based on a lexical analysis. In addition, the method includes, responsive to the performing, determining whether the credit inquiry is related to a previous credit inquiry for the monitored consumer. Further, the method includes, responsive to a determination that the credit inquiry is related to a previous credit inquiry, suppressing a credit alert to the monitored consumer.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, systems and methods described herein can be leveraged to identify and group together credit inquiries that relate to a same credit category and/or a same creditor. In this fashion, the volume of credit alerts that are presented to monitored consumers can be reduced in a controlled manner.

For purposes of this patent application, a credit inquiry refers to an attempt to obtain information from a consumer's credit file. A creditor, as used herein, refers to one who initiates a credit inquiry. For example, a creditor may initiate a credit inquiry in connection with evaluating a consumer's credit-worthiness. As described in greater detail below, a credit inquiry generally relates to a credit category. A credit category, as used herein, refers to a classification of a credit product to which a given credit inquiry relates. For example, in various embodiments, credit categories can includes automobile loans, home mortgages, revolving lines of credit such as credit cards, apartment rentals, and the like.

A monitored consumer, as used herein, refers to a consumer whose credit file is being monitored, for example, by an identity or credit-monitoring system. An identity or credit-monitoring system may monitor consumers' credit, for example, as a subscription-based service. Therefore, monitored consumers may receive periodic alerts, for example, as new credit inquiries appear in their credit file.

Figure 1:
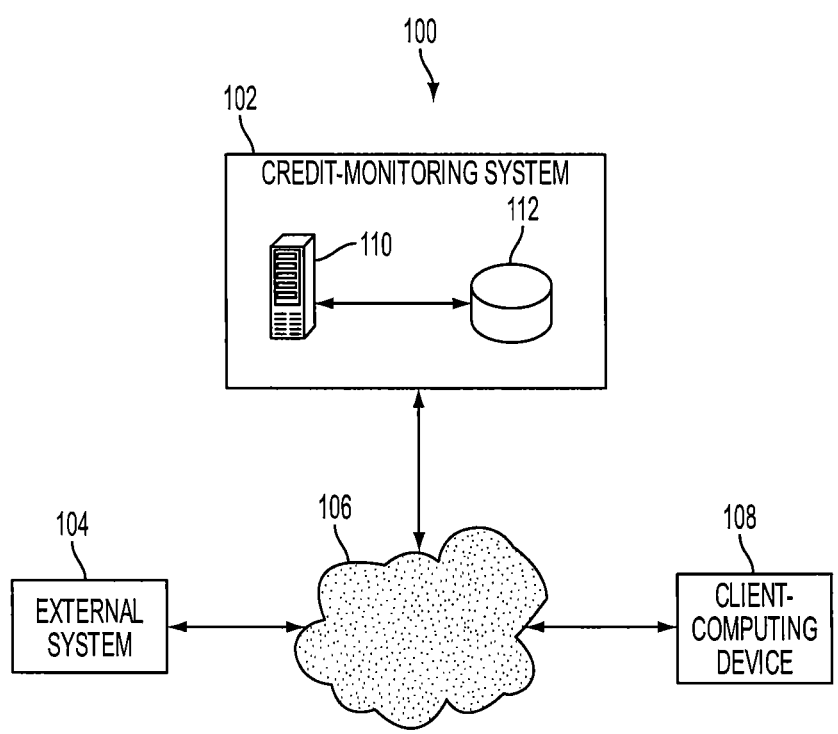
FIG. 1 illustrates a system that can be used to identify related credit inquiries.

FIG. 1 illustrates a system 100 that can be used to identify related credit inquiries. The system 100 includes a credit-monitoring system 102, one or more external systems 104, and one or more client-computing devices 108. The credit-monitoring system 102 includes at least one server computer 110 communicably coupled to one or more databases 112. The credit-monitoring system 102 is operable to communicate with the one or more external systems 104 and the one or more client-computing devices 108 over a network 106.

The credit-monitoring system 102 is shown to include the at least one server computer 110 and the one or more databases 112 for illustrative purposes. One of ordinary skill in the art will appreciate that each instance of a computer such as, for example, the at least one server computer 110, may be representative of any number of physical or virtual server computers. Likewise, each instance of a database such as, for example, the one or more databases 112, may be representative of a plurality of databases. Moreover, each instance of a system such as, for example, the credit-monitoring system 102 and the one or more external systems 104, may be representative of any combination of computing equipment including, for example, any number of physical or virtual server computers and any number and organization of databases. In addition, it should be appreciated that, in various embodiments, the network 106 can be viewed as an abstraction of multiple distinct networks via which the credit-monitoring system 102 is operable to communicate. For example, the network 106 can include one or multiple communications networks such as, for example, public or private intranets, a public switch telephone network (PSTN), a cellular network, the Internet, or the like.

In a typical embodiment, the credit-monitoring system 102, via the at least one server computer 110, provides credit-monitoring services to monitored consumers. In particular, the credit-monitoring system 102 is operable to identify suspicious events related to the monitored consumers' personally identifying information (PII), determine whether credit alerts are merited, and generate and deliver such credit alerts when deemed merited. A suspicious event can include, for example, a new credit inquiry appearing in a given monitored consumer's credit file. Information about identified suspicious events, monitored consumers, and each monitored consumer's credit file is typically stored in the one or more databases 112.

The one or more client-computing devices 108 are computer systems used by the monitored consumers, for example, to view or receive credit alerts. The one or more client-computing devices 108 can include, for example, desktop computers, laptop computers, tablet computers, smart phones, PSTN telephones, cellular phones, and the like. The monitored consumers are typically enrollees of the credit-monitoring system 102. Enrollees are generally individuals who have registered with the credit-monitoring system 102 and have passed applicable security prerequisites for enrollment such as, for example, an identity-verification process.

The one or more external systems 104 are representative of computer systems from which the credit-monitoring system 102 is operable to receive information about the monitored consumers' credit files. For example, the one or more external systems 104 may each be associated with a credit bureau and be operable to provide information about the monitored consumers' credit files via, for example, an application programming interface (API).

Examples of identity and/or credit-monitoring systems that can be included as part of the credit-monitoring system 102 are described in U.S. Pat. No. 8,359,278 and in U.S. patent application Ser. Nos. 13/093,664, 13/398,471, and 12/780,130. In addition, U.S. patent application Ser. No. 13/093,664 describes how monitored consumers can enroll for credit monitoring and how identity alerts such as, for example, credit alerts, can be generated and presented to the monitored consumers. U.S. Pat. No. 8,359,278 and U.S. patent application Ser. Nos. 13/093,664, 13/398,471, and 12/780,130 are hereby incorporated by reference.

In operation, the credit-monitoring system 102 monitors the credit files of the monitored consumers via information received from the one or more external systems 104. As necessary, the credit-monitoring system 102 generates and delivers credit alerts to appropriate monitored consumers via the one or more client-computing devices 108. In a typical embodiment, the credit-monitoring system 102 is operable to identify credit alerts that are related so that credit alerts deemed redundant or unnecessary can be suppressed (i.e., not presented to a given monitored consumer). In various embodiments, the credit-monitoring system 102 may allow the monitored consumers to configure the extent to which credit alerts deemed related should be suppressed. FIGS. 2-11 describe examples of methods that can be implemented by the credit-monitoring system 102 to identify related credit inquiries.

Figure 2:
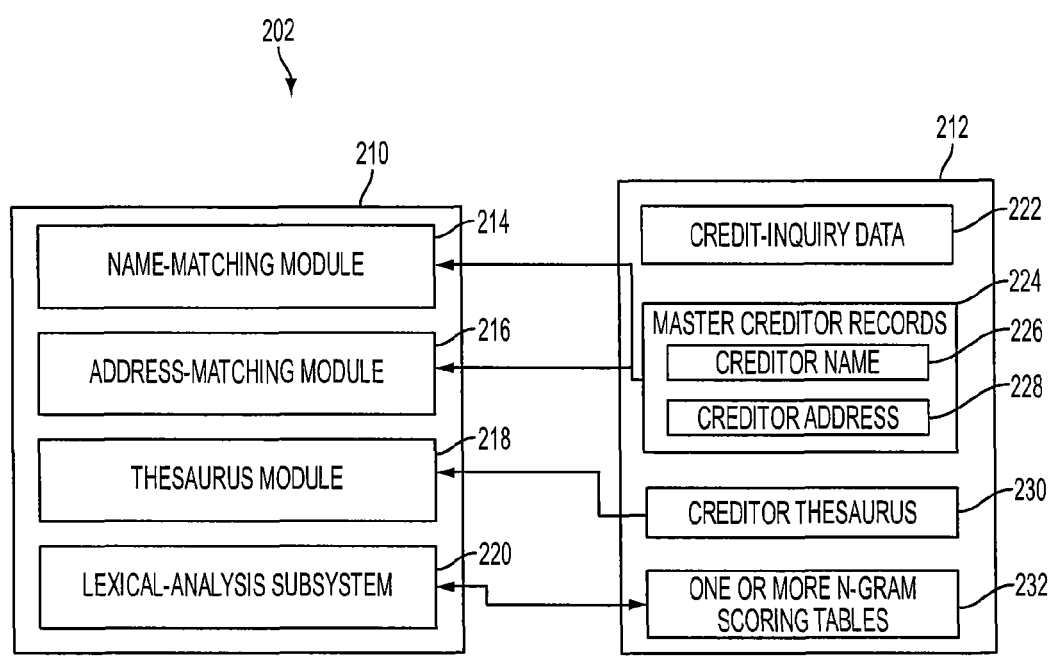
FIG. 2 illustrates exemplary software components and data of a credit-monitoring system.

FIG. 2 illustrates exemplary software components and data of a credit-monitoring system 202. The credit-monitoring system 202 includes at least one server computer 210 and one or more databases 212. In a typical embodiment, the credit-monitoring system 202, the at least one server computer 210, and the one or more databases 212 operate as described with respect to the credit-monitoring system 102, the at least one server computer 110, and the one or more databases 112, respectively, of FIG. 1.

The at least one server computer 210 has resident and executing thereon a name-matching module 214, an address-matching module 216, a thesaurus module 218, and a lexical-analysis subsystem 220. As described in greater detail below, the name-matching module 214, the address-matching module 216, the thesaurus module 218, and the lexical-analysis subsystem 220 are each an example of a credit-inquiry analysis that may be performed by the at least one server computer 210.

The one or more databases 212 are operable to store, inter alia, credit-inquiry data 222, master creditor records 224, a creditor thesaurus 230, and one or more n-gram scoring tables 232. In various embodiments, the one or more n-gram storing tables may instead be stored in a flat file rather than in the one or more databases 212 as illustrated. The credit-inquiry data 222 corresponds to information regarding credit inquiries that have appeared in credit files of monitored consumers. In a typical embodiment, the credit-inquiry data 222 is received via one or more external systems such as, for example, the one or more external systems 104 of FIG. 1.

The master creditor records 224 correspond to a master list of known creditors. For each known creditor listed therein, the master creditor records 224 typically include a creditor name 226 and a creditor address 228. The creditor name 226 is typically a canonical creditor name, i.e., a primary name by which a particular creditor is known. Therefore, the master creditor records 224 are operable to serve, inter alia, as a master name list and a master address list. In addition, the master creditor records 224 typically associates at least a portion of the creditors listed therein with one or more credit categories. In various embodiments, some creditors' activities may be so expansive that it is not practical to label those creditors as doing business relative to particular credit categories. In these cases, the master creditor records 224 may not associate such creditors with any specific credit categories.

The creditor thesaurus 230 stores a list of alternative names (i.e., synonyms) for each of at least a portion of the creditors represented in the master creditor records 224. In particular, for each creditor represented therein, the creditor thesaurus 230 maps the list of alternative names to the creditor name 226 (i.e., a many-to-one relationship between the list of alternative names and the creditor name 226). The one or more n-gram scoring tables 232 store information generated and used by the lexical-analysis subsystem 220. The one or more n-gram scoring tables 232 will be described in greater detail below with respect to the lexical-analysis subsystem 220.

In a typical embodiment, the name-matching module 214 is a software module that attempts to compare a provided creditor name with the master name list maintained by the master creditor records 224. In a typical embodiment, the name-matching module 214 returns any creditors from the master creditor records 224 whose name is deemed to match the provided creditor name. Exemplary operation of the name-matching module 214 will be described with respect to FIG. 3.

In a typical embodiment, the address-matching module 216 is a software module that attempts to compare a provided creditor address with the master address list maintained by the master creditor records 224. In a typical embodiment, the address-matching module 216 returns any creditors from the master creditor records 224 whose address is deemed to match the provided creditor address. Exemplary operation of the address-matching module will be described with respect to FIGS. 4A-4B.

In a typical embodiment, the thesaurus module 218 is a software module that attempts to compare a provided creditor name with the creditor thesaurus 230. In a typical embodiment, the thesaurus module 218 returns any creditors whose alternative name from the creditor thesaurus 230 is deemed to match the provided creditor name. The thesaurus module 218 is generally most effective for creditors that are larger and considered more stable. Smaller, less stable creditors are generally more subject to frequent name changes (e.g., due to merger-and-acquisition activity). Frequent name changes can lead to an undesirable level of manual maintenance of the creditor thesaurus 230. Therefore, in various embodiments, the creditor thesaurus 230 may only maintain alternative names for creditors that are deemed most stable. Exemplary operation of the thesaurus module 218 will be described with respect to FIG. 5.

In a typical embodiment, the lexical-analysis subsystem 220 analyzes sequences of n words (referred to herein as "n-grams") that appear in creditor names (hereinafter, "creditor-name n-grams"). For purposes of this patent application, each distinct value of n refers to a distinct n-gram type. For example, a sequence of one word refers to an n-gram type of unigram. By way of further example, a sequence of two words refers to an n-gram type of bigram. In various embodiments, the lexical-analysis subsystem 220 may be utilized to analyze multiple types of n-grams such as, for example, unigrams and bigrams. The lexical-analysis subsystem 220 is typically intended to operate successfully on the creditor names a priori. For example, while the thesaurus module 218 may require frequent updates to effectively deal with unstable creditors, the lexical-analysis subsystem 220 can be effective in such situations without a need for frequent updates.

In a typical embodiment, for a given type of n-gram, the lexical-analysis subsystem 220 identifies each n-gram of the given type within the master name list of the master creditor records 224. The lexical analysis subsystem 220 then scores the extent to which each identified n-gram is indicative of a plurality of credit categories. In a typical embodiment, the lexical-analysis subsystem 220 stores the scores in the one or more n-gram scoring tables 232. In various embodiments, the one or more n-gram scoring tables 232 can include a distinct table for each type of n-gram for which scores are generated. In various other embodiments, the one or more n-gram scoring tables 232 can store all n-grams in a single table regardless of n-gram type.

Based on the one or more n-gram scoring tables 232, the lexical-analysis subsystem 220 can analyze n-grams of a same type that appear within a provided creditor name (e.g., from a credit inquiry). The lexical-analysis subsystem 220 is operable to infer a credit category from the analyzed n-grams and return the inferred credit category. Exemplary operation of the lexical-analysis subsystem 220 will be described with respect to FIGS. 7-8.

In various embodiments, the name-matching module 214, the address-matching module 216, the thesaurus module 218, and the lexical-analysis subsystem 220 may be used individually to analyze credit inquiries. In various other embodiments, the name-matching module 214, the address-matching module 216, the thesaurus module 218, and the lexical-analysis subsystem 220 may be used in various advantageous combinations to analyze credit inquiries. Examples of how the name-matching module 214, the address-matching module 216, the thesaurus module 218, and the lexical-analysis subsystem 220 may be utilized in combination will be described with respect to FIGS. 9-10.

Although the name-matching module 214, the address-matching module 216, the thesaurus module 218, and the lexical-analysis subsystem 220 are depicted as separate software components, in various other embodiments, such software components are organized differently. For example, the name-matching module 214, the address-matching module 216, the thesaurus module 218, and the lexical-analysis subsystem 220 could be merged into a single software component, each be further divided into other software components, or have their collective functionality allocated differently among any number of software components.

Figure 3:
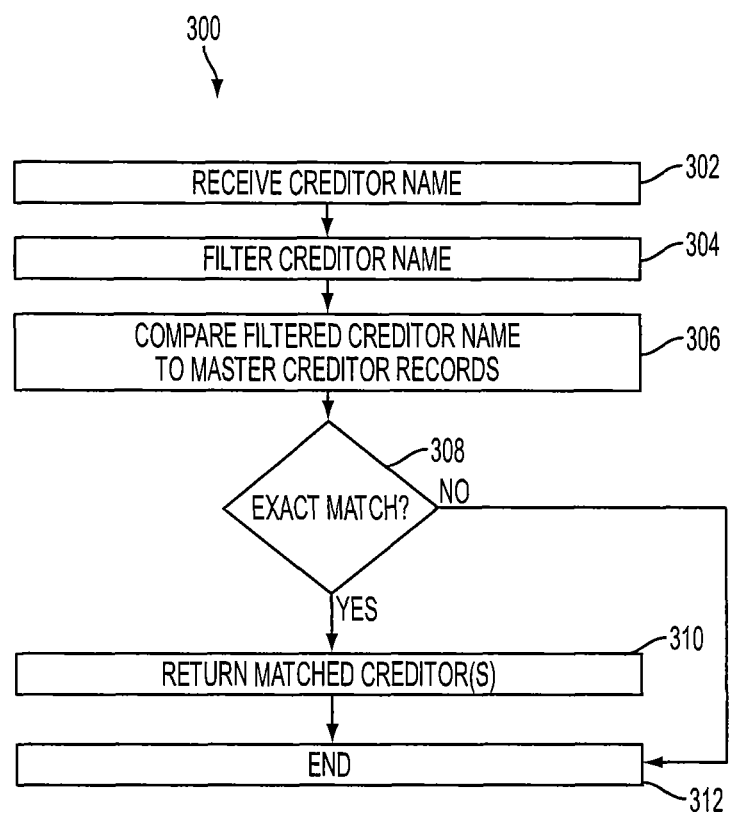
FIG. 3 illustrates a process for name matching.

FIG. 3 illustrates a process 300 for name matching that may be performed by a name-matching module such as, for example, the name-matching module 214 of FIG. 2. The name-matching module is resident and executing on a server computer such as, for example, the at least one server computer 110 of FIG. 1 or the at least one server computer 210 of FIG. 2. The process 300 begins at step 302.

At step 302, the name-matching module receives a creditor name. In a typical embodiment, the creditor name has been extracted from a credit inquiry as part of credit monitoring of a monitored consumer. From step 302, the process 300 proceeds to step 304. At step 304, the name-matching module filters the creditor name to remove, for example, multiple contiguous spaces and punctuation. In various embodiments, the name-matching module may also filter the creditor name to remove words deemed to be noise words such as, for example, "the," "and," and the like. From step 304, the process 300 proceeds to step 306.

At step 306, the name-matching module compares the filtered creditor name to a filtered version of each creditor name in master creditor records such as, for example, the master creditor records 224 of FIG. 2. In various embodiments, the master creditor records maintain a filtered version of each creditor name in the master creditor records. In these embodiments, no computation of the filtered version needs to occur. In various other embodiments, the master creditor records may not maintain the filtered version of each creditor name. In these embodiments, the filtered version of each creditor name is produced on-the-fly in the same manner as described with respect to step 304. From step 306, the process 300 proceeds to step 308.

At step 308, it is determined whether there is an exact match between the filtered creditor name and the filtered version of any creditor name in the master creditor records. If not, the process 300 proceeds to step 312 and ends without an exact match. If it is determined at step 308 that there is an exact match between the filtered creditor name and the filtered version of at least one creditor name in the master creditor records, the process 300 proceeds to step 310. At step 310, the name-matching module returns each matched creditor (e.g., by canonical creditor name or unique identifier). From step 310, the process 300 proceeds to step 312. At step 312, the process 300 ends.

Figure 4A:
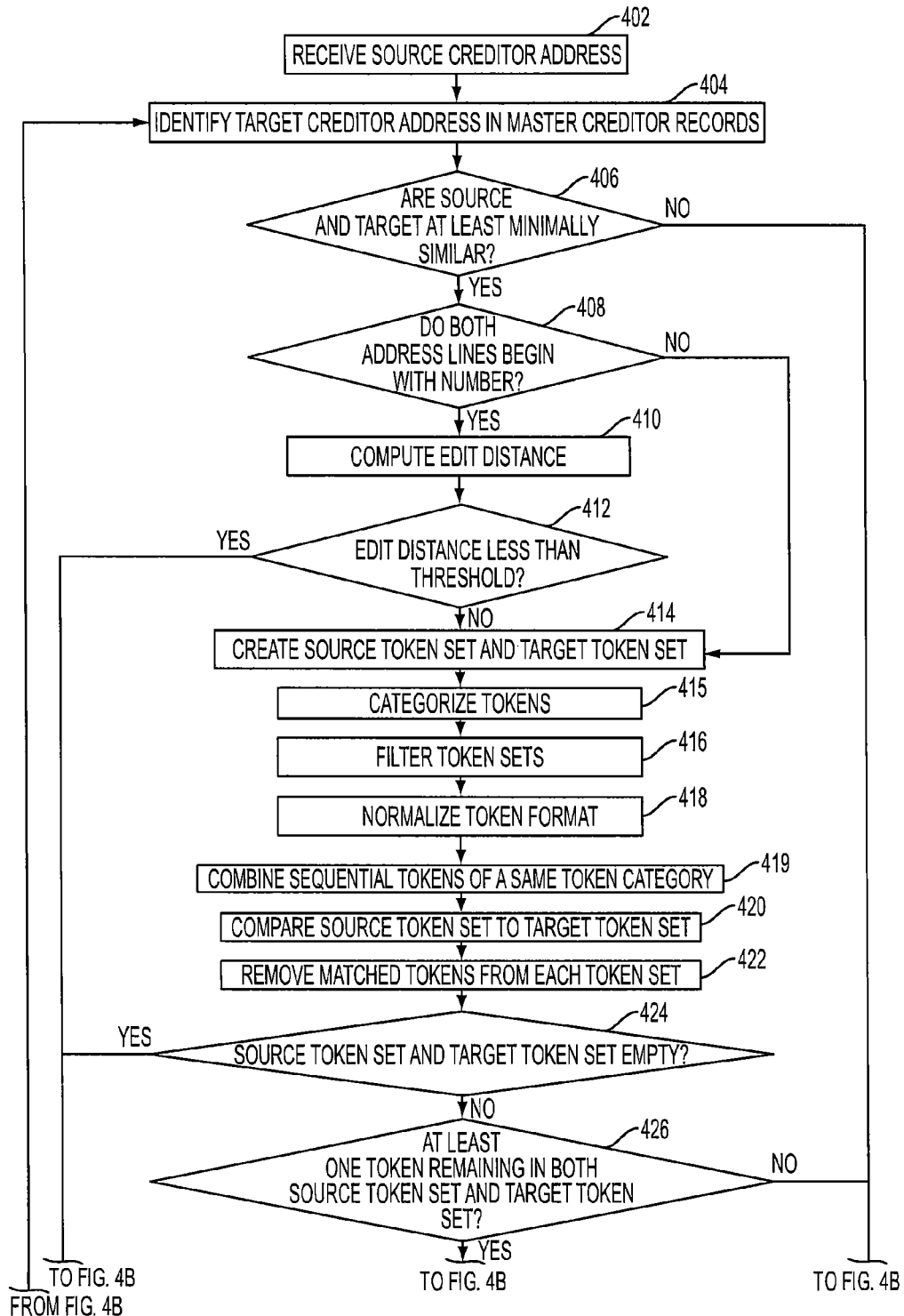
FIGS. 4A-4B illustrate a process for address matching.
Figure 4B:
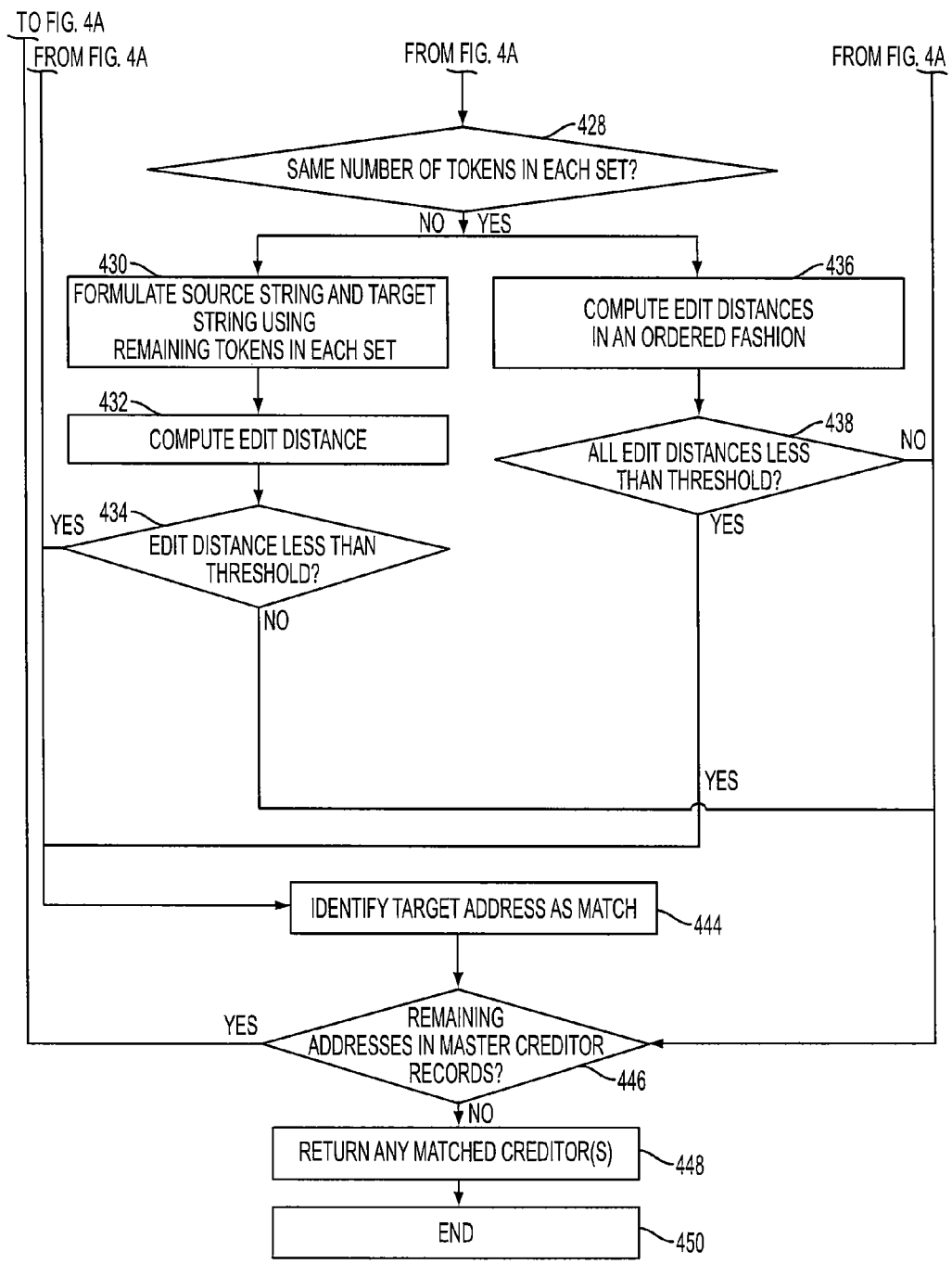

FIGS. 4A-4B illustrate a process 400 for address matching that may be performed by an address-matching module such as, for example, the address-matching module 216 of FIG. 2. The address-matching module is resident and executing on a server computer such as, for example, the at least one server computer 110 of FIG. 1 or the at least one server computer 210 of FIG. 2. The process 400 begins at step 402.

At step 402, the address-matching module receives a source creditor address. In a typical embodiment, the source creditor address includes address elements that have been extracted from a credit inquiry as part of credit monitoring of a monitored consumer. The address elements can include, for example, a city, a state or province, a ZIP code, an address line (e.g., street number, street name, P.O. Box, etc.), and the like. From step 402, the process 400 proceeds to step 404. At step 404, the address-matching module identifies a target creditor address from a master address list maintained by master creditor records such as, for example, the master creditor records 224 of FIG. 2. In a typical embodiment, the address-matching module systematically traverses the master address list so that each creditor address stored therein is eventually treated as the target creditor address. From step 404, the process 400 proceeds to step 406.

At step 406, the address-matching module determines whether the source creditor address and the target creditor address are at least minimally similar. For example, the determination can encompass comparing a city, state or province, and ZIP code of the source creditor address to a city, state or province, and ZIP code of the target creditor address. In various embodiments, the source creditor address and the target creditor address are deemed at least minimally similar if any two of city, state, and ZIP code exactly match. In various other embodiments, the source creditor address and the target creditor address are deemed at least minimally similar if either: (1) both city and state exactly match; or (2) both ZIP code and state exactly match. Other criteria for determining minimal similarity may also be utilized.

If it is determined at step 406 that the source creditor address and the target creditor address are not at least minimally similar, the process 400 proceeds to step 446. In various embodiments, this determination is an efficient indication that the source creditor address and the target creditor address are highly unlikely to refer to a same physical location. Therefore, the computational expense of performing various ones of steps 408-444 can be avoided. If it is determined at step 406 that the source creditor address and the target creditor address are at least minimally similar, the process 400 proceeds to step 408.

At step 408, the address-matching module determines whether both an address line of the source creditor address and an address line of the target creditor address begin with a number (i.e., 0-9) as opposed, for example, to beginning with a letter or non-numeric symbol. In a typical embodiment, edit-distance functionality described with respect to steps 410-412 is deemed more effective when both the address line of the source creditor address and the address line of the target creditor address begin with a number. Therefore, if it is determined at step 408 that the address line of either the source creditor address or the target creditor address does not begin with a number, the process 400 proceeds to step 414 as a performance optimization. Alternatively, if it is determined at step 408 that both the address line of the source creditor address and the address line of the target creditor address begin with a number, the process 400 proceeds to step 410.

At step 410, the address-matching module computes an edit distance between the address line of the source creditor address and the address line of the target creditor address. In a typical embodiment, the edit distance can be computed as the minimum number of edits needed to transform one string into the other, with the allowable edit operations including, for example, insertion, deletion, or substitution of a single character or transposition, for example, of two characters. From step 410, the process 400 proceeds to step 412. At step 412, the address-matching module determines whether the computed edit distance is less than a pre-determined threshold. In various embodiments, the pre-determined threshold is configurable based on a desired margin of error for the address-matching module. If it is determined at step 412 that the computed edit distance is less than the pre-determined threshold, the process 400 proceeds to step 444 so that the source creditor address and the target creditor address can be identified as a match. Step 444 will be described in greater detail below. If it is determined at step 412 that the computed edit distance is not less than the pre-determined threshold, the process 400 proceeds to step 414.

At step 414, the address-matching module creates a source token set based on the address line of the source creditor address and a target token set based on the address line of the target creditor address (i.e., tokenization). In a typical embodiment, spaces are used as delimiters for the tokenization. However, it should be appreciated that other delimiters such as, for example, commas, periods, and the like may also be utilized depending on a format of the source creditor address and the target creditor address. From step 414, the process 400 proceeds to step 415.

At step 415, the address-matching module categorizes each token in the source token set and each token in the target token set into one of a plurality of categories. The plurality of categories can include, for example, empty token, numeric token, alpha token, and unknown token. For purposes of illustration, Table 1 below provides a description for the categories of empty token, numeric token, alpha token, and unknown token. From step 415, the process 400 proceeds to step 416.

TABLE 1

| TOKEN CATEGORY | DESCRIPTION |
| --- | --- |
| Empty Token | Indicates that the token has no contents. |
| Numeric Token | Indicates that the token contains at least one digit. |

TABLE 1-continued

| TOKEN CATEGORY | DESCRIPTION |
|---|---|
| Alpha Token | Indicates that the token contains only letters and no digits. |
| Unknown Token | Indicates that the token is not an empty token, a numeric token, or an alpha token. |

At step 416, the address-matching module filters the source token set and the target token set to remove tokens deemed insignificant such as, for example, standard directional indicators (e.g., north, south, east, west), standard street suffixes (e.g., street, avenue, drive, etc.), and standard abbreviations thereof. From step 416, the process 400 proceeds to step 418. At step 418, the address-matching module normalizes a token format of the source token set and the target token set. For example, the normalization can include converting cardinal numbers (e.g., "one," "two," and "three") and ordinal numbers (e.g., "first," "second," and "third") to numeric equivalents. For example, "one" could be converted to "1" and "first" could be converted to "1st." From step 418, the process 400 proceeds to step 419.

At step 419, for each of the source token set and the target token set, the address-matching module combines sequential tokens that have been categorized into a same token category. For example, if the first two tokens of the source token set have been categorized into the token category of alpha, those two tokens would be combined into a single token. By way of further example, if the first token and the third token of the source token set have been categorized into the token category of alpha while the second token has been categorized into the token category of numeric token, there is typically no basis for combining tokens. From step 419, the process 400 proceeds to step 420.

At step 420, the address-matching module compares the source token set to the target token set. In a typical embodiment, the comparison involves identifying each instance of an exact match between a token of the source token set and a token of the target token set. Each exact match is typically represented by a token pair comprising one token from the source token set and one token from the target token set. From step 420, the process 400 proceeds to step 422. At step 422, the address-matching module removes each exact match from the source token set and the target token set as the exact match is identified. From step 422, the process 400 proceeds to step 424.

At step 424, it is determined whether the source token set and the target token set are empty. In a typical embodiment, the source token set and the target set being empty signifies that the source creditor address matches the target creditor address. Accordingly, if it is determined at step 424 that the source token set and the target token set are empty, the process 400 proceeds to step 444. If it is determined at step 424 that the source token set, the target token set, or both are not empty, the process 400 proceeds to step 426.

At step 426, the address-matching module determines whether at least one token remains in both the source token set and the target token set (i.e., whether both token sets are non-empty). If it is determined at step 426 that either the source token set or the target token set is empty, the process 400 proceeds to step 446. In a typical embodiment, this determination indicates that the source creditor address and the target creditor address do not match. If it is determined at step 426 that at least one token remains in both the source token set and the target token set, the process 400 proceeds to step 428.

At step 428, the address-matching module determines whether the source token set and the target token set contain a same number of tokens. In some embodiments, if it is determined at step 428 that the source token set and the target token set do not contain the same number of tokens, this determination indicates that the source creditor address and the target creditor address do not match. In these embodiments, the process 400 may proceed to step 446 (not illustrated). In various other embodiments, as illustrated, additional processing may be performed in an attempt to identify a match. In these embodiments, the process 400 proceeds from step 428 to step 430 as illustrated.

At step 430, the address-matching module formulates a source string based on the remaining tokens in the source token set and a target string based on the remaining tokens in the target token set. In embodiments in which the tokenization described above uses spaces as delimiters, the address-matching module restores the spaces when formulating the source string and the target string. In that way, the source string is typically a concatenation of the remaining tokens of the source token set, in the order in which those tokens appear, such that each token is separated by a space. In similar fashion, the target string is typically a concatenation of the remaining tokens of the target token set, in the order in which those tokens appear, such that each token is separated by a space. From step 430, the process 400 proceeds to step 432.

At step 432, the address-matching module computes an edit distance between the source string and the target string in a similar fashion to that described above with respect to step 410. From step 432, the process 400 proceeds to step 434. At step 434, the address-matching module determines whether the computed edit distance is less than a pre-determined threshold. In a typical embodiment, the predetermined threshold is specifically tuned for steps 432-434. Therefore, in a typical embodiment, the predetermined threshold utilized at step 434 may be different than the predetermined threshold utilized above at step 412. If it is determined at step 434 that the computed edit distance is less than the pre-determined threshold, the process 400 proceeds to step 444 so that the source creditor address and the target creditor address can be identified as a match. If it is determined at step 434 that the computed edit distance is not less than the pre-determined threshold, the process 400 proceeds to step 446. In a typical embodiment, this determination indicates that the source creditor address and the target creditor address do not match.

If it is determined at step 428 that the source token set and the target token set contain the same number of tokens, the process 400 proceeds to step 436. At step 436, the address-matching module computes an edit distance between each token pair in an ordered fashion. In particular, edit distances are computed between the first token of the source token set and the first token of the target token set, between the second token of the source token set and the second token of the target token set, etc. Thus, for example, if the source token set and the target token set each contain five tokens, five edit distances are computed. From step 436, the process 400 proceeds to step 438.

At step 438, the address-matching module determines whether all edit distances computed at step 436 are less than a predetermined threshold. In a typical embodiment, the predetermined threshold is specifically timed for steps 436-438. Therefore, in a typical embodiment, the predetermined threshold utilized at step 438 may be different than the predetermined thresholds utilized above at steps 412 and 434. If it is determined at step 438 that fewer than all edit distances computed at step 436 are less than the pre-determined threshold, the process 400 proceeds to step 446. In a typical embodiment, this determination indicates that the source creditor address and the target creditor address do not match. If it is determined at step 438 that all edit distances computed at step 436 are less than the pre-determined threshold, the process 400 proceeds to step 444.

At step 444, the address-matching module identifies the target creditor address as matching the source creditor address. More specifically, the target creditor address and the source creditor address are deemed to be equivalent. In various embodiments, a creditor name associated with the source creditor address may be linked to a creditor name associated with the target creditor address in a temporary linking table. In a typical embodiment, the temporary linking table allows the link to be compared for consistency with results of other credit-inquiry analyses as described, for example, with respect to FIG. 10. From step 444, the process 400 proceeds to step 446.

If it is determined at step 442 that the source token set, the target token set, or both are not empty, the process 400 proceeds to step 446. In a typical embodiment, this determination indicates that the source creditor address and the target creditor address do not match. At step 446, it is determined whether there are additional creditor addresses in the master creditor records that have not been handled by the address-matching module. If so, the process 400 returns to step 404 for identification of another target creditor address. If it is determined at step 446 that there are no additional creditor addresses in the master creditor records that have not been handled by the address-matching module, the process 400 proceeds to step 448. At step 448, any matched creditors (i.e., creditors having addresses deemed to match the source creditor address) are returned. For example, any matched creditors may be returned by canonical creditor name or by a unique identifier. From step 448, the process 400 proceeds to step 450. At step 450, the process 400 ends.

In various embodiments, the process 400 may be further optimized by using principles of inverse domain frequency (IDF). IDF may be expressed as an inverse of a frequency of occurrence of a particular unigram in a domain corpus. In the context of the process 400, the domain corpus is an address list such as, for example, the master address list maintained by the master creditor records 224 of FIG. 2. In a typical embodiment, the domain corpus is not cleansed or filtered in any way. Rather, the domain corpus generally includes addresses as the addresses have appeared in credit inquiries. The address list, however, typically includes each variation of a particular address only once (ignoring, e.g., capitalization).

The IDF can be calculated by: (1) counting how many times a unigram occurs in the domain corpus; and (2) computing a ratio of the count of all unigrams in the domain corpus to the count for a particular unigram. The computed ratio may be considered the IDF. For example, if there were 500,000 unigrams in the domain corpus and 10,000 of those were "Ave" while 50 of those were "Connecticut," the IDF for "Ave" would be 50 while the IDF for "Connecticut" would be 10,000.

With respect to the process 400 of FIG. 4, in various embodiments, the process 400 can be optimized by eliminating step 416 (filtering) in favor of a weighted edit-distance algorithm. In particular, if a source token contained "Connecticutt Av" and a target token contained "Connecticut Ave," the source token and the target token would be divided into unigrams (i.e., "Connecticutt" and "Av" for the source token and "Connecticut" and "Ave" for the target token), with the source token and the target token each consituting a phrase. "Connecticutt and Av" may be considered source unigrams while "Connecticut" and "Ave" may be considered target unigrams. Thereafter, an edit distance between corresponding source unigrams and target unigrams can be computed in an ordered fashion (i.e., first unigram to first unigram, second unigram to second unigram, etc.). As described below, each edit distance can then be weighted based on the computed IDFs for the target unigrams.

For example, edit distances could be computed between "Connecticutt" and "Connecticut" and between "Av" and "Ave." Using the illustrative IDFs computed above, the edit distance can then be weighted in a normalized manner for the phrase. First, a highest IDF for the phrase is typically identified. For purposes of this example, "Connecticut" has the highest IDF (i.e., 10,000). Subsequently, for each edit distance, the edit distance can be multiplied by a weight that is a ratio of a target unigram's IDF to the highest IDF. Therefore, the edit distance between "Connecticutt" and "Connecticut" would be multiplied by 10,000/10,000 (i.e., one). Similarly, the edit distance between "Av" and "Ave" would be multiplied by 50/10,000 (i.e., 0.005). The weighted edit distances can then be summed to yield an edit distance for the phrase (i.e. the edit distance between the source token and the target token). In this fashion, IDF allows a contribution of common unigrams to be discounted in the weighted edit-distance algorithm. In various embodiments, the weighted edit-distance algorithm may be used for computing any edit distance referenced in the process 400.

Figure 5:
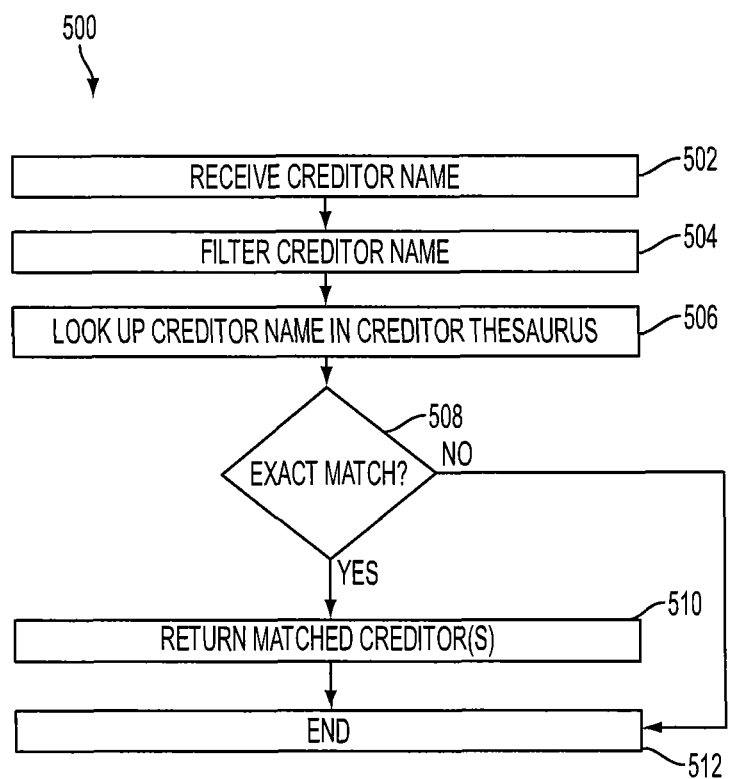
FIG. 5 illustrates a process for performing a creditor-thesaurus lookup.

FIG. 5 illustrates a process 500 for performing a creditor-thesaurus lookup. The process 500 is typically performed by a thesaurus module such as, for example, the thesaurus module 218 of FIG. 2. The thesaurus module is resident and executing on a server computer such as, for example, the at least one server computer 110 of FIG. 1 or the at least one server computer 210 of FIG. 2. The process 500 begins at step 502.

At step 502, the thesaurus module receives a creditor name. In a typical embodiment, the creditor name has been extracted from a credit inquiry as part of credit monitoring of a monitored consumer. From step 502, the process 500 proceeds to step 504. At step 504, the thesaurus module filters the creditor name to remove, for example, spaces and punctuation. In various embodiments, the thesaurus module may also filter the creditor name to remove words deemed to be noise words such as, for example, "the," "and," and the like. From step 504, the process 500 proceeds to step 506.

At step 506, the thesaurus module looks up each filtered creditor name in a creditor thesaurus such as, for example, the creditor thesaurus 230 of FIG. 2. In a typical embodiment, the look-up involves comparing each filtered creditor name to a filtered version of each creditor name in the creditor thesaurus 230. In various embodiments, the creditor thesaurus maintain a filtered version of each creditor name stored therein. In these embodiments, no computation of the filtered version needs to occur. In various other embodiments, the creditor thesaurus may not maintain the filtered version of each creditor name stored therein. In these embodiments, the filtered version of each creditor name is produced on-the-fly in the same manner as described with respect to step 504. From step 506, the process 500 proceeds to step 508.

At step 508, it is determined whether there is an exact match between the filtered creditor name and the filtered version of any creditor name in the creditor thesaurus. If there is not an exact match, the process 500 proceeds to step 512 and ends without an exact match. If it is determined at step 508 that there is an exact match between the filtered creditor name and the filtered version of at least one creditor name in the creditor thesaurus, the process 500 proceeds to step 510. At step 510, the thesaurus module returns each matched creditor (e.g., by canonical creditor name, unique identifier, and/or a predetermined credit category if one exists). From step 510, the process 500 proceeds to step 512. At step 512, the process 500 ends.

Figure 6:
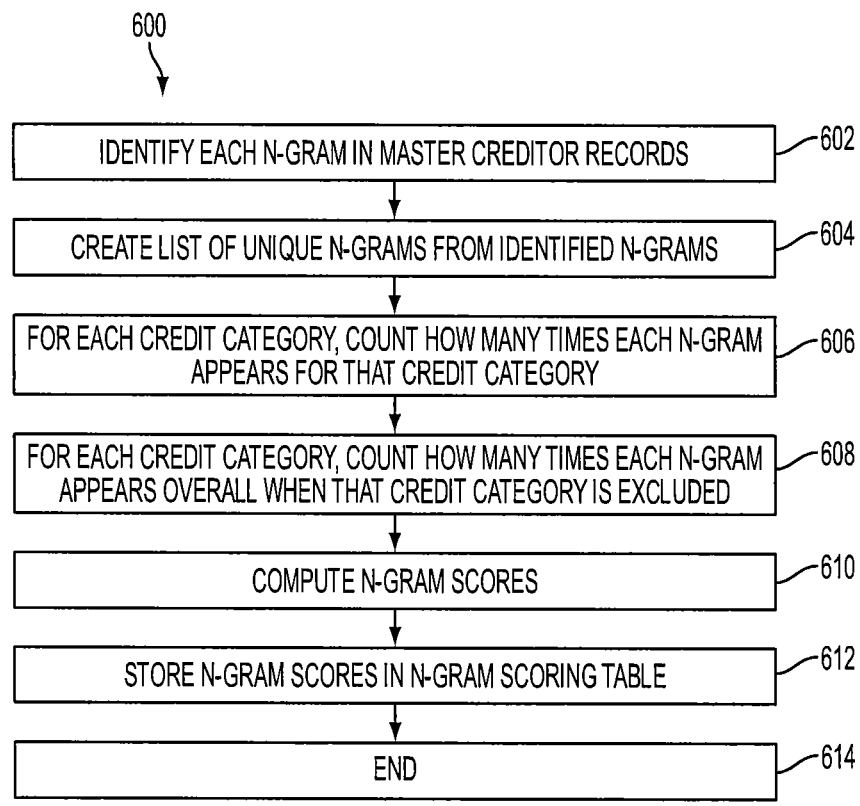
FIG. 6 describes a process for creating an n-gram scoring table.
Figure 7:
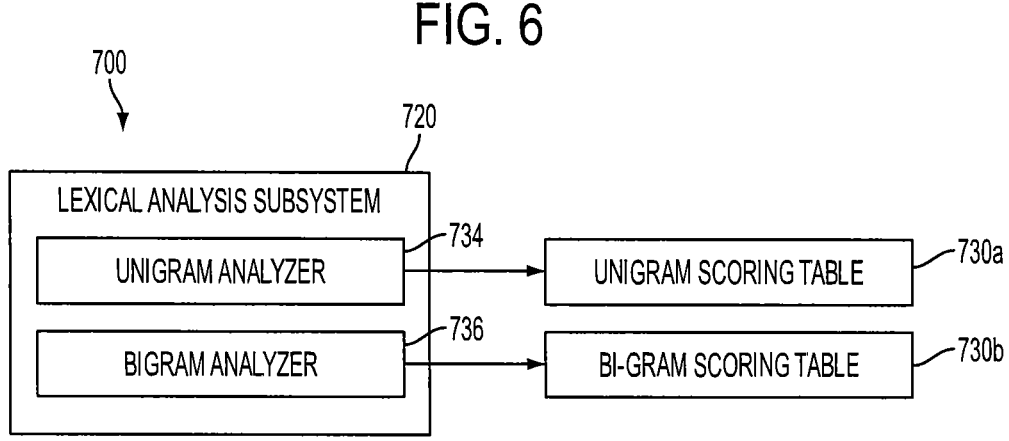
FIG. 7 illustrates a lexical-analysis subsystem.
Figure 8:
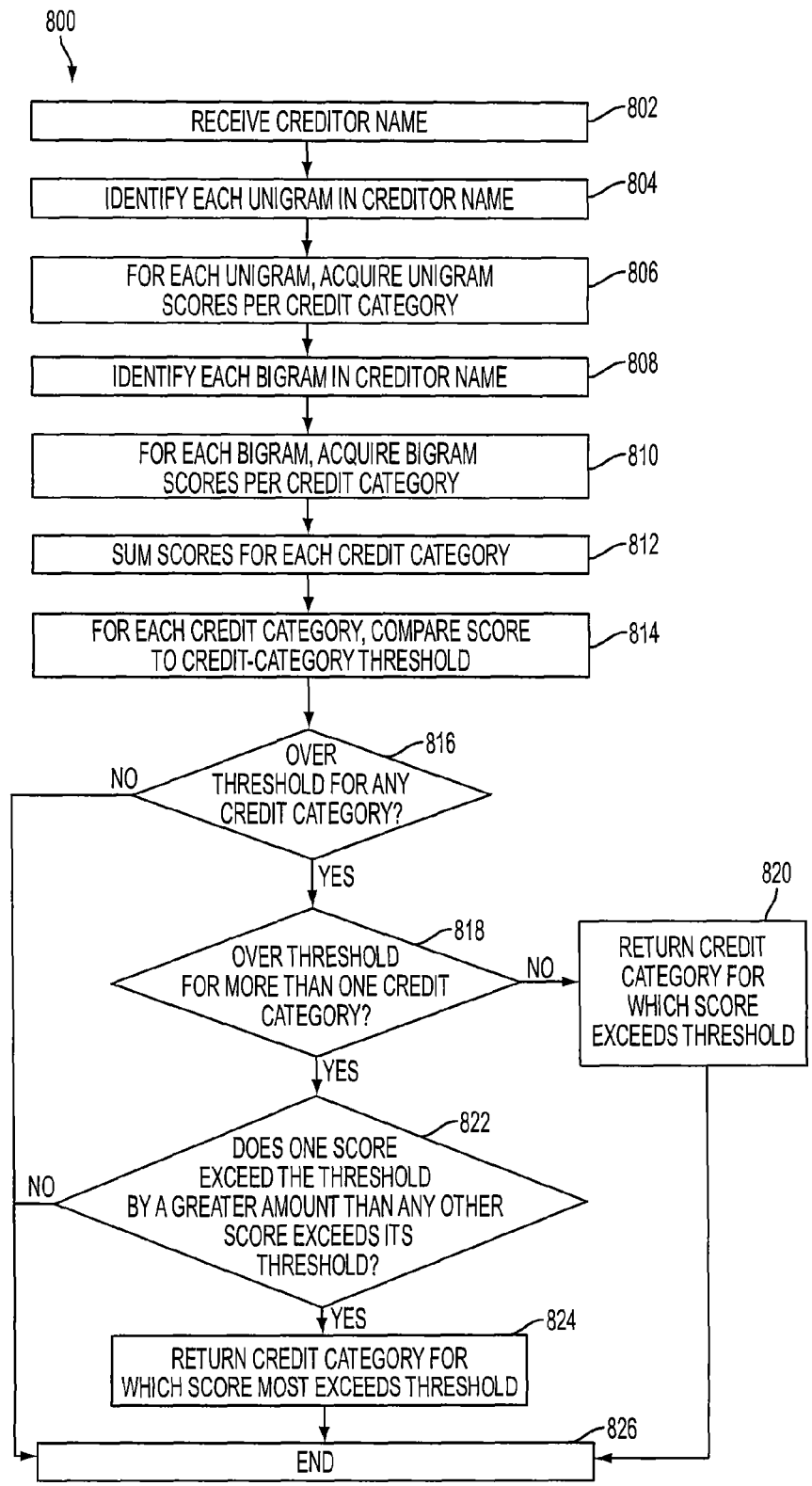
FIG. 8 illustrates a process for analyzing a creditor name using an n-gram scoring table.

FIGS. 6-8 describe exemplary functionality of a lexical-analysis subsystem such as, for example, the lexical-analysis subsystem 220 of FIG. 2. In particular, FIG. 6 describes a process 600 for creating an n-gram scoring table such as, for example, the one or more n-gram scoring tables 232 of FIG. 2. In various embodiments, the process 600 may be performed once, on demand, at regular intervals, or responsive to changes to master creditor records such as, for example, the master creditor records 224 of FIG. 2. The process 600 may be performed by a lexical-analysis subsystem such as, for example, the lexical-analysis subsystem 220 of FIG. 2. The lexical-analysis subsystem is resident and executing on a server computer such as, for example, the at least one server computer 110 of FIG. 1 or the at least one server computer 210 of FIG. 2. The process 600 begins at step 602.

At step 602, the lexical-analysis subsystem identifies all n-grams of an n-gram type that appear in each creditor name listed in a set of categorized creditors. As described above with respect to FIG. 2, master creditor records such as, for example, the master creditor records 224 of FIG. 2, typically associate at least a portion of the creditors listed therein with one or more of a plurality of credit categories. Therefore, the set of categorized creditors typically refers to those creditors that are associated with at least one credit category in the master creditor records. In a typical embodiment, creditors are only allowed to be associated with a single credit category. The n-gram type may specify, for example, unigrams, bigrams, or the like. In a typical embodiment, step 602 yields a set of zero or more n-grams for each categorized creditor (zero n-grams representing an empty set). From step 602, the process 600 proceeds to step 604.

At step 604, the lexical-analysis subsystem creates a list of unique n-grams from the identified n-grams. Each distinct string of the n-gram type (ignoring capitalization) is typically considered a unique n-gram. From step 604, the process 600 proceeds to step 606.

At step 606, the lexical-analysis subsystem counts how many times each unique n-gram appears per creditor category. As noted above, each creditor in the set of categorized creditors is typically associated with one or more credit categories. In a typical embodiment, the set of categorized creditors only includes creditors associated with a single credit category. Therefore, for each categorized creditor, n-grams from that creditor's name are counted towards the single credit category with which that creditor is associated.

In a typical embodiment, step 606 yields a plurality of n-gram counts for each unique n-gram. For a given unique n-gram, each n-gram count typically corresponds to a particular credit category. Table 2 below provides an example of the plurality of n-gram counts with respect to unigrams of "car," "motor," and "company" and credit categories of credit card, automobile loan, and home mortgage. The column "all other" encompasses the appearance of the unigrams "car," "motor," and "company" among uncategorized creditors. From step 606, the process 600 proceeds to step 608.

TABLE 2

|  | CREDIT CARD | AUTOMOBILE-LOAN | HOME MORTGAGE | ALL OTHER |
|---|---|---|---|---|
| "CAR" | 3 | 352 | 2 | 1 |
| "MOTOR" | 5 | 453 | 21 | 10 |
| "COMPANY" | 234 | 247 | 231 | 300 |

At step 608, the lexical-analysis subsystem counts, for each credit category, how many times each unique n-gram appears overall when that credit category is excluded. In other words, for a given credit category and a given unique n-gram, step 608 produces an exclusion n-gram count. The exclusion n-gram count is an enumeration of how many times the given unique n-gram appears in the master creditor records for creditors that are not associated with the given credit category. In a typical embodiment, the exclusion n-gram count includes creditors associated with a different credit category as well as uncategorized creditors. In a typical embodiment, step 608 yields a plurality of exclusion n-gram counts for each unique n-gram. For a given unique n-gram, each exclusion n-gram count typically corresponds to a particular credit category. In a typical embodiment, the plurality of exclusion n-gram counts can be represented in a form similar to that shown above in Table 2. From step 608, the process 600 proceeds to step 610.

At step 610, a plurality of n-gram scores are computed for each unique n-gram. For a given unique n-gram, each n-gram score typically corresponds to a particular credit category. In a typical embodiment, the plurality of n-gram scores are computed from the plurality of n-gram counts and the plurality of exclusion n-gram counts. For example, an n-gram score for a particular n-gram relative to a particular credit category can be computed using Equation 1 below, where $C_1$ equals an n-gram count for the particular credit category and $C_2$ equals an exclusion n-gram count for the particular credit category.

$$\text{Score} = \log_{10} \frac{C_1}{C_2} \qquad \text{Equation 1}$$

For purposes of illustration, an example of the application of Equation 1 will now be described. With respect to Table 2, if it were desired to calculate an n-gram score for the n-gram of "CAR" and the credit category of automobile loan, $C_1$ would have a value of 352 and $C_2$ would have a value of 6. Therefore, the n-gram score would equal approximately 1.77. As an example of how an n-gram score might be negative, if it were desired to calculate an n-gram score for the n-gram of "MOTOR" and the credit category of credit card, $C_1$ would have a value of 5 and $C_2$ would have a value of 484. Therefore, the n-gram score would equal approximately −1.98. From step 610, the process 600 proceeds to step 612. At step 612, all n-gram scores computed at step 610 are stored by n-gram and credit category in an n-gram scoring table such as, for example, the one or more n-gram scoring tables 232 of FIG. 2. From step 612, the process 600 proceeds to step 614. At step 614, the process 600 ends.

FIG. 7 illustrates a lexical-analysis subsystem 720. The lexical-analysis subsystem 720 includes a unigram analyzer 734 and a bigram analyzer 736. In a typical embodiment, the unigram analyzer 734 is operable to create a unigram scoring table 730a utilizing a process such as, for example, the process 600 of FIG. 6. In a typical embodiment, the bigram analyzer 736 is operable to create a bigram scoring table 730b utilizing a process such as, for example, the process 600 of FIG. 6.

FIG. 8 illustrates a process 800 for analyzing a creditor name using an n-gram scoring table. The process 800 may be performed by a lexical-analysis subsystem such as, for example, the lexical-analysis subsystem 220 of FIG. 2 or the lexical-analysis subsystem 720 of FIG. 7. The lexical-analysis subsystem is resident and executing on a server computer such as, for example, the at least one server computer 110 of FIG. 1 or the at least one server computer 210 of FIG. 2. The lexical-analysis subsystem typically includes a unigram analyzer such as, for example, the unigram analyzer 734 of FIG. 7, and a bigram analyzer such as, for example, the bigram analyzer 736 of FIG. 7. The process 800 begins at step 802.

At step 802, the lexical-analysis subsystem receives a creditor name. In a typical embodiment, the received creditor name has been extracted from a credit inquiry as part of credit monitoring of a monitored consumer. From step 802, the process 800 proceeds to step 804. At step 804, the lexical-analysis subsystem identifies, via the unigram analyzer, each unigram that appears in the creditor name. From step 804, the process 800 proceeds to step 806. At step 806, the lexical-analysis subsystem acquires, for each identified unigram, unigram scores by credit category. In a typical embodiment, the unigram scores are acquired from a unigram scoring table such as, for example, the unigram scoring table 730a of FIG. 7. From step 806, the process 800 proceeds to step 808.

At step 808, the lexical-analysis subsystem identifies, via the bigram analyzer, each bigram that appears in the creditor name. From step 808, the process 800 proceeds to step 810. At step 810, the lexical-analysis subsystem acquires, for each identified bigram, bigram scores by credit category. In a typical embodiment, the bigram scores are acquired from a bigram scoring table such as, for example, the bigram scoring table 730b of FIG. 7. From step 810, the process 800 proceeds to step 812.

At step 812, the lexical-analysis subsystem sums the acquired unigram scores and the acquired bigram scores by credit category. Specifically, for a given credit category, all unigram scores and bigram scores applicable to the given credit category are summed to yield a credit-category score. In this manner, step 812 typically yields a credit-category score for each credit category. From step 812, the process 800 proceeds to step 814. At step 814, for each credit category, the credit-category score is compared to a score threshold that is specific to that credit category. From step 814, the process 800 proceeds to step 816.

At step 816, the lexical-analysis subsystem determines whether any credit-category score exceeds its respective threshold. If not, the process 800 proceeds to step 826 and ends without returning an inferred credit category. If it is determined at step 816 that at least one credit-category score exceeds its respective threshold, the process 800 proceeds to step 818. At step 818, the lexical-analysis subsystem determines whether more than one credit-category score exceeds its respective threshold. If not, the process 800 proceeds to step 820. At step 820, the lexical-analysis subsystem returns the credit category corresponding to the credit-category score that exceeds its respective threshold. The returned credit category represents a credit category inferred by the lexical-analysis subsystem based on the creditor name received at step 802. From step 820, the process 800 proceeds to step 826 and ends.

If it is determined at step 818 that more than one credit-category score exceeds its respective threshold, the process 800 proceeds to step 822. At step 822, the lexical-analysis subsystem determines whether one credit-category score exceeds its respective threshold by a greater amount than any other credit-category score exceeds its respective threshold. If not, the process 800 proceeds to step 826 and ends without returning an inferred credit category. If it is determined at step 822 that a particular credit-category score exceeds its respective threshold by a greater amount than any other credit-category score exceeds its respective threshold, the process 800 proceeds to step 824. At step 824, the lexical-analysis subsystem returns the credit category corresponding to the particular credit-category score. The returned credit category represents a credit category inferred by the lexical-analysis subsystem based on the creditor name received at step 802. From step 824, the process 800 proceeds to step 826 and ends.

Figure 9:
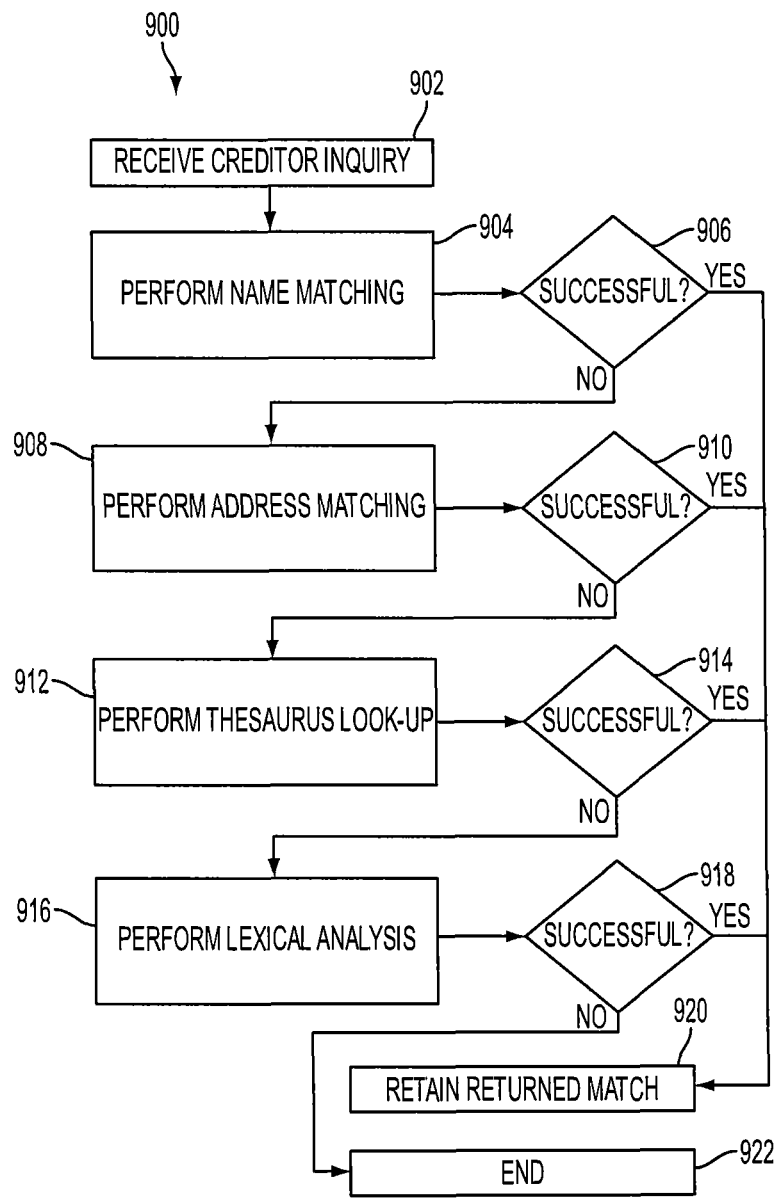
FIG. 9 illustrates a process for analyzing credit inquiries.

FIG. 9 illustrates a process 900 for analyzing credit inquiries. The process 900 may be executed by a server computer such as, for example, the at least one server computer 110 of FIG. 1 or the at least one server computer 210 of FIG. 2. In particular, the process 900 is facilitated by a combination of a name-matching module (e.g., the name-matching module 214 of FIG. 2), an address-matching module (e.g., the address-matching module 216 of FIG. 2), a thesaurus module (e.g., the thesaurus module 218 of FIG. 2), and a lexical-analysis subsystem (e.g., the lexical-analysis subsystem 220 of FIG. 2 or the lexical-analysis subsystem 720 of FIG. 7). The process 900 begins at step 902.

At step 902, the server computer receives a credit inquiry. The credit inquiry typically identifies a creditor responsible for the credit inquiry by at least a creditor name and a creditor address. From step 902, the process 900 proceeds to step 904. At step 904, the server computer performs name matching using the creditor name. In a typical embodiment, the server computer uses a name-matching module such as, for example, the name-matching module 214 of FIG. 2, that performs a name-matching process such as, for example, the process 300 of FIG. 3. From step 904, the process 900 proceeds to step 906.

At step 906, the server computer determines whether the name matching was successful. In a typical embodiment, what constitutes success is configurable based on a desired margin for error. In a typical embodiment, the name matching is considered successful if the name-matching module returns exactly one creditor from master creditor records such as, for example, the master creditor records 224 of FIG. 2, as a match. If it is determined at step 906 that the name matching was successful, the process 900 proceeds to step 920. At step 920, the server computer retains the returned match. From step 920, the process 900 proceeds to step 922. At step 922, the process 900 ends.

If it is determined at step 906 that the name matching was not successful, the process 900 proceeds to step 908. At step 908, the server computer performs address matching using the creditor address. In a typical embodiment, the server computer utilizes an address-matching module such as, for example, the address-matching module 216 of FIG. 2, that performs an address-matching process such as, for example, the process 400 of FIGS. 4A-4B. From step 908, the process 900 proceeds to step 910.

At step 910, the server computer determines whether the address matching was successful. In a typical embodiment, what constitutes success is configurable based on a desired margin for error. In a typical embodiment, the address matching is considered successful if the address-matching module returns one match from the master creditor records. If it is determined at step 910 that the address matching was successful, the process 900 proceeds to step 920 and operates as described above.

If it is determined at step 910 that the address matching was not successful, the process 900 proceeds to step 912. At step 912, the server computer performs a creditor-thesaurus lookup. In a typical embodiment, the server computer utilizes a thesaurus module such as, for example, the thesaurus module 218 of FIG. 2, that performs a process such as, for example, the process 500 of FIG. 5. From step 912, the process 900 proceeds to step 914.

At step 914, the server computer determines whether the creditor-thesaurus lookup was successful. In a typical embodiment, what constitutes success is configurable based on a desired margin for error. In a typical embodiment, the creditor-thesaurus lookup is considered successful if the thesaurus module returns one match from the master creditor records. If it is determined at step 914 that the thesaurus module was successful, the process 900 proceeds to step 920 and operates as described above.

If it is determined at step 914 that the thesaurus lookup was not successful, the process 900 proceeds to step 916. At step 916, the server computer performs a lexical analysis. In a typical embodiment, the server computer utilizes a lexical-analysis subsystem such as, for example, the lexical-analysis subsystem 220 of FIG. 2 or the lexical-analysis 720 of FIG. 7. The lexical-analysis subsystem typically performs a process such as, for example, the process 600 of FIG. 6 or the process 800 of FIG. 8. From step 916, the process 900 proceeds to step 918.

At step 918, the server computer determines whether the lexical analysis was successful. In a typical embodiment, what constitutes success is configurable based on a desired margin for error. In a typical embodiment, the lexical analysis is considered successful if the lexical-analysis subsystem returns one inferred credit category from the master creditor records. If it is determined at step 918 that the lexical-analysis subsystem was successful, the process 900 proceeds to step 920 and operates as described above. If it is determined at step 918 that the lexical analysis was not successful, the process 900 proceeds to step 922 and ends without a retained match.

As described above with respect to FIG. 9, processes of name matching, address matching, a thesaurus lookup, and a lexical analysis are shown to be performed in a particular order. While the particular order may have certain advantages in various embodiments, it should be appreciated that such processes can be performed in any particular sequence or in parallel. Additionally, in various embodiments, all or part of such processes may be performed regardless of whether any particular process is deemed successful. For example, as described below with respect to FIG. 10, in various embodiments, a voting methodology may be implemented across a plurality of modules.

Figure 10:
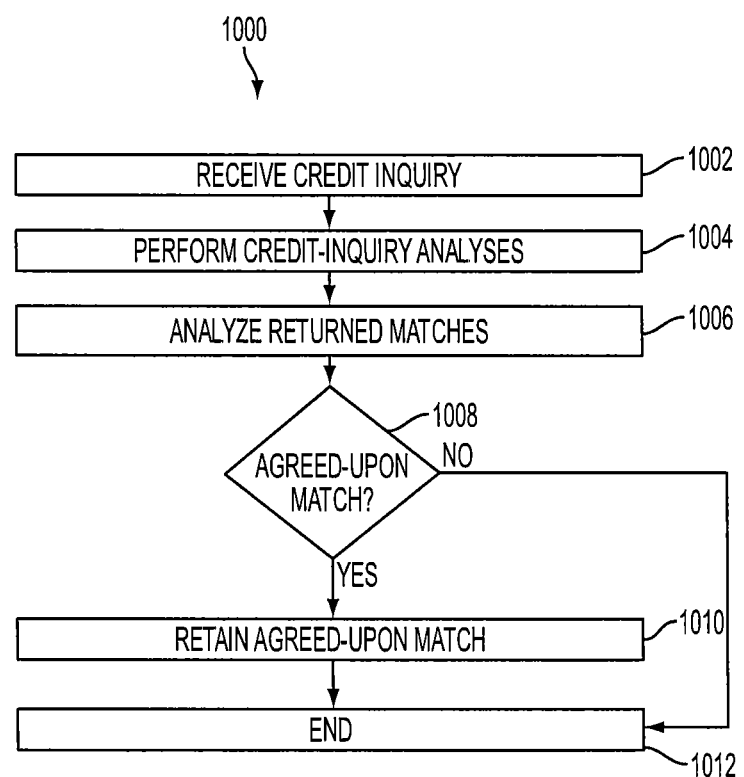
FIG. 10 illustrates a process for analyzing credit inquiries utilizing a voting methodology.

FIG. 10 illustrates a process 1000 for analyzing credit inquiries utilizing a voting methodology. The process 1000 may be executed by a server computer such as, for example, the at least one server computer 110 of FIG. 1 or the at least one server computer 210 of FIG. 2. The process 1000 begins at step 1002. At step 1002, the server computer receives a credit inquiry. The credit inquiry typically identifies a creditor responsible for the credit inquiry by at least a creditor name and a creditor address. From step 1002, the process 1000 proceeds to step 1004.

At step 1004, the server computer performs a plurality of credit-inquiry analyses on the credit inquiry. For example, in various embodiments, the server computer utilizes a name-matching module (e.g., the name-matching module 214 of FIG. 2), an address-matching module (e.g., the address-matching module 216 of FIG. 2), a thesaurus module (e.g., the thesaurus module 218 of FIG. 2), and a lexical-analysis subsystem (e.g., the lexical-analysis subsystem 220 of FIG. 2 or the lexical-analysis subsystem 720 of FIG. 7). In this manner, the server computer typically performs a name-matching process (e.g., the process 300 of FIG. 3), an address-matching process (e.g., the process 400 of FIGS. 4A-4B), a creditor-thesaurus lookup (e.g., the process 500 of FIG. 5), and a lexical analysis (e.g., the process 600 of FIG. 6 or the process 800 of FIG. 8). From step 1004, the process 1000 proceeds to step 1006.

At step 1006, the server computer analyzes any returned matches from each of the name-matching module, the address-matching module, the thesaurus module, and the lexical-analysis subsystem. In a typical embodiment, the analysis encompasses comparing the returned matches to determine agreement. For example, the name-matching module, the thesaurus module, and/or the address-matching may be determined to agree to the extent each module returns a same creditor from master creditor records such as, for example, the master creditor records 224 of FIG. 2. By way of further example, an inferred credit category returned by the lexical-analysis subsystem may be determined to agree with a creditor returned by any of the name-matching module, the thesaurus module, and the address-matching module to the extent that the returned creditor is associated with the inferred credit category in the master creditor records. From step 1006, the process 1000 proceeds to step 1008.

At step 1008, it is determined whether there is an agreed-upon match among the plurality of analyses performed at step 1004. In a typical embodiment, what constitutes an agreed-upon match is a configurable threshold. For example, in various embodiments, an agreed-upon match is determined when any three of the name-matching module, the address-matching module, the thesaurus module, and the lexical-analysis module agree. By way of further example, each analysis of the plurality of analyses can be weighted according to a propensity of the analysis to be correct. It should be appreciated that numerous other combinations can also be specified as the configurable threshold.

If it is determined at step 1008 that there is an agreed-upon match, the process 1000 proceeds to step 1010. At step 1010, the agreed-upon match is retained. From step 1010, the process 1000 proceeds to step 1012. If it is determined at step 1008 that there is not an agreed-upon match, the process 1000 proceeds to step 1012 without a match being retained. At step 1012, the process 1000 ends.

In various embodiments, whenever a credit inquiry cannot be matched to either a particular creditor or a particular credit category as described with respect to FIGS. 1-10, the credit inquiry can be tracked by a credit-monitoring system such as, for example, the credit-monitoring system 102 of FIG. 1. In a typical embodiment, unmatched credit inquiries can be grouped together using, for example, an exact-name match of creditor names. Particular groups of credit inquiries that have a high frequency count can be periodically reviewed to troubleshoot or optimize a credit-inquiry analysis performed by a name-matching module (e.g., the name-matching module 214 of FIG. 2), an address-matching module (e.g., the address-matching module 216 of FIG. 2), a thesaurus module (e.g., the thesaurus module 218 of FIG. 2), and/or a lexical-analysis subsystem (e.g., the lexical-analysis subsystem 220 of FIG. 2 or the lexical-analysis subsystem 720 of FIG. 7).

Figure 11:
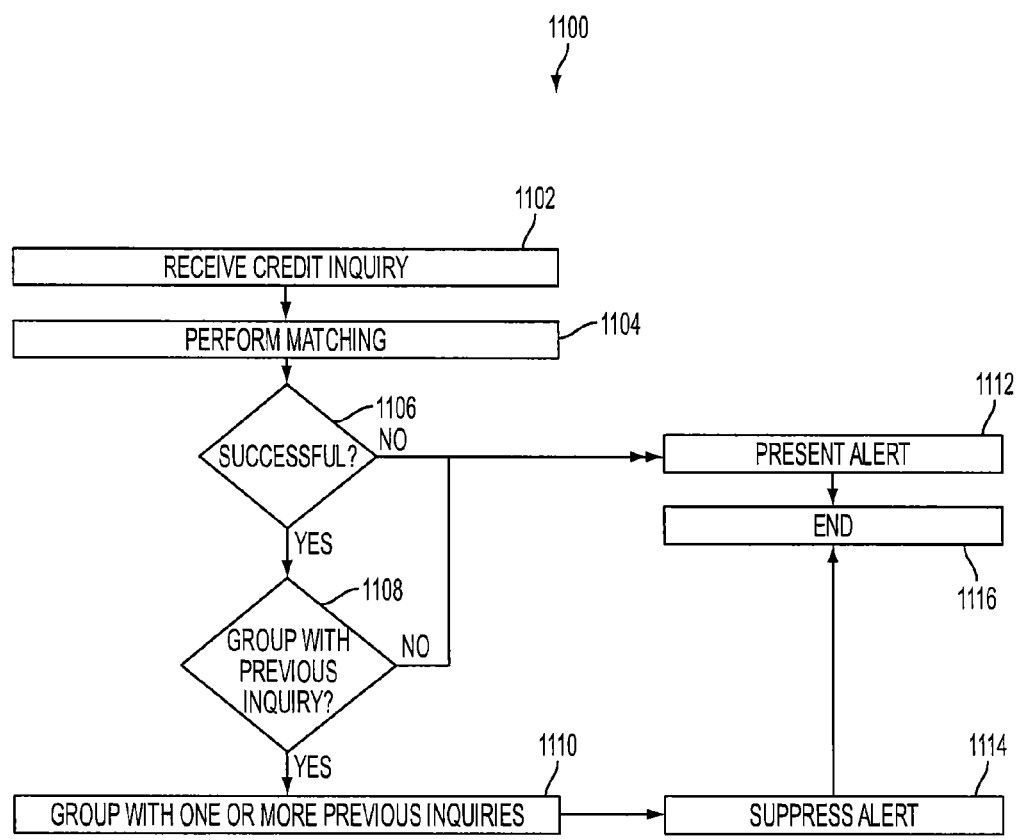
FIG. 11 illustrates a process for identifying related credit inquiries.

FIG. 11 illustrates a process 1100 for identifying related credit inquiries based on, for example, methodologies described above with respect to FIGS. 1-10. The process 1100 may be executed by a server computer such as, for example, the at least one server computer 110 of FIG. 1 or the at least one server computer 210 of FIG. 2. The process 1100 begins at step 1102. At step 1102, the server computer receives a credit inquiry for a monitored consumer. The credit inquiry typically identifies a creditor responsible for the credit inquiry by at least a creditor name and a creditor address. From step 1102, the process 1100 proceeds to step 1104.

At step 1104, the server computer performs a matching process. In various embodiments, the matching process may include one or more credit-inquiry analyses as described with respect to FIGS. 1-10. From step 1104, the process 1100 proceeds to step 1106. At step 1106, it is determined whether the matching process was successful. In a typical embodiment, the matching process is deemed successful if exactly one creditor or credit category is returned. If it is determined at step 1106 that the matching process was not successful, the process 1100 proceeds to step 1112. At step 1112, the server computer alerts the monitored consumer of the credit inquiry. From step 1112, the process 1110 proceeds to step 1116. At step 1116, the process 1100 ends.

If it is determined at step 1106 that the matching process was successful, the process 1100 proceeds to step 1108. At step 1108, the server computer determines whether the credit inquiry should be grouped with a previously-received inquiry. In a typical embodiment, it is determined that the credit inquiry should be grouped with a previously-received credit inquiry if the monitored consumer has had another credit inquiry for a same creditor or a same credit category within a predetermined window of time (e.g., four days). If it is determined at step 1108 that the credit inquiry should not be grouped with a previously-received credit inquiry, the process 1100 proceeds to step 1112 and operates as described above.

If it is determined at step 1108 that the credit inquiry should be grouped with a previously-received credit inquiry, the process 1100 proceeds to step 1110. At step 1110, the credit inquiry is grouped with each credit inquiry for which it has been determined that the credit inquiry should be grouped. From step 1110, the process 1100 proceeds to step 1114. At step 1114, the server computer suppresses a credit alert for the credit inquiry that would otherwise have been presented to the monitored consumer. From step 1114, the process 1100 proceeds to step 1116. At step 1116, the process 1100 ends.

In various embodiments, the process 1100 of FIG. 11 is facilitated by maintaining temporary tables. A server computer such as, for example, the server computer 110 of FIG. 1 or the server computer 210 of FIG. 2 of FIG. 2, can maintain a temporary table for each monitored consumer that sets forth each credit inquiry within a predetermined window of time (e.g., four days). Each temporary table typically includes a row for each credit inquiry occurring within the predetermined window of time. To the extent the information is available, the temporary table can include, for each credit inquiry, a canonical name for a creditor, a creditor address, a credit category, a date, an indication of whether a credit alert was issued or suppressed, and/or other like information.

The temporary tables can be consulted, for example, at step 1108 of the process 1100, as part of determining whether a particular credit inquiry should be grouped with a previous inquiry. In that way, the temporary tables can serve as a record of previous credit inquiries for monitored consumers within the predetermined window of time. In a typical embodiment, the server computer updates the temporary tables to remove aging credit inquiries that no longer fall within the predetermined window of time.

For a given new credit inquiry that is received, the server computer generally updates a corresponding temporary table at the conclusion of a process such as, for example, the process 1100 of FIG. 1. Following the process 1100, the server computer will generally have gleaned a canonical creditor name, a creditor address, and/or a credit category for the given new credit inquiry. Therefore, the server computer can add a new row to the corresponding temporary table that includes an identifier for the given new credit inquiry, the canonical creditor name, the creditor address, and/or the credit category for the given new credit inquiry. The new row can further include a date of the given credit inquiry and an indication of whether a credit alert was issued or suppressed. The corresponding temporary table as updated can then be used in future iterations of the process 1100.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   on a computer system comprising at least one processor and memory, receiving a credit inquiry for a monitored consumer;
   performing, by the computer system, at least one credit-inquiry analysis on the credit inquiry;
   wherein the performing yields at least one of:
      a matched creditor from master creditor records; and
      an inferred credit category based on a lexical analysis;
   responsive to the performing, the computer system determining whether the credit inquiry is related to a previous credit inquiry for the monitored consumer;
   wherein the credit inquiry and the previous credit inquiry are determined to be related if the previous credit inquiry is within a predetermined window of time of the credit inquiry and at least one of the following is true:
      the credit inquiry and the previous credit inquiry have been deemed to refer to a same creditor; and
      the credit inquiry and the previous credit inquiry have been deemed to refer to a same credit category, wherein a credit category comprises a classification of a credit product to which a given credit inquiry relates;
   responsive to a determination that the credit inquiry is related to a previous credit inquiry, the computer system suppressing a credit alert to the monitored consumer;
   wherein the performing comprises returning, as a matched creditor, any creditor from the master creditor records whose creditor address is deemed to match a source creditor address;
   wherein a target creditor address comprises a target address line and the source creditor address comprises a source address line;
   creating a source token set based on the source address line and a target token set based on the target address line;
   categorizing each token in the source token set and each token in the target token set into one of a plurality of categories;
   filtering the source token set and the target token set;
   for each of the source token set and the target token set, combining sequential tokens categorized into a same token category;
   normalizing a token format of the source token set and the target token set;
   comparing tokens of the source token set to tokens of the target token set;
   wherein the comparing of the source creditor address comprises identifying a target creditor address in the master creditor records;
   responsive to the comparing of the source token set to the target token set, removing each exact match from the source token set and the target token set; and
   responsive to a determination that the source token set and the target token set are empty, identifying the source creditor address and the target creditor address as a match.

2. The method of claim 1, wherein the performing comprises:
- comparing a provided creditor name from the credit inquiry with a master name list maintained by the master creditor records; and
- returning, as a matched creditor, any creditor from the master creditor records whose creditor name is deemed to match the provided creditor name.

3. The method of claim 1, wherein the performing comprises
- returning, as a matched creditor, any creditor from the master creditor records whose creditor address is deemed to match the source creditor address.

4. The method of claim 1, wherein the comparing of the source creditor address comprises:
- responsive to a determination that the source token set and the target token set are not empty, determining whether at least one token remains in both the source token set and the target token set;
- responsive to a determination that at least one token remains in both the source token set and the target token set, determining whether the source token set and the target token set contain a same number of tokens;
- responsive to a determination that the source token set and the target token set contain a same number of tokens, formulating a source string based on remaining tokens in the source token set and a target string based on remaining tokens in the target token set;
- computing an edit distance between the source string and the target string; and
- responsive to a determination that the edit distance between the source string and the target string is less than a predetermined threshold, identifying the source creditor address and the target creditor address as a match.

5. The method of claim 4, wherein the comparing of the source creditor address comprises:
- responsive to a determination that the source token set and the target token set do not contain a same number of tokens, computing an edit distance between each token pair in an ordered fashion;
- determining whether all edit distances computed in the ordered fashion are less than a predetermined threshold; and
- responsive to a determination that all edit distances computed in the ordered fashion are less than the predetermined threshold, identifying the source creditor address and the target creditor address as a match.

6. The method of claim 1, wherein the performing comprises:
- comparing a provided creditor name from the credit inquiry with a creditor thesaurus; and
- returning any creditor whose alternative name from the creditor thesaurus is deemed to match the provided creditor name.

7. The method of claim 6, wherein the creditor thesaurus does not comprise alternative names for creditors deemed unstable.

8. The method of claim 1, wherein the performing comprises:
- analyzing n-grams of a particular n-gram type that appear within a creditor name from the credit inquiry;
- inferring a credit category from the analyzed n-grams; and
- returning the inferred credit category.

9. The method of claim 1, wherein the determining comprises consulting a temporary table for the monitored consumer, the temporary table comprising previous credit inquiries within the predetermined window of time.

10. A method comprising:
- on a computer system comprising at least one processor and memory, receiving a credit inquiry for a monitored consumer;
- performing, by the computer system, at least one credit-inquiry analysis on the credit inquiry;
- wherein the performing yields at least one of:
  - a matched creditor from master creditor records; and
  - an inferred credit category based on a lexical analysis;
- responsive to the performing, the computer system determining whether the credit inquiry is related to a previous credit inquiry for the monitored consumer;
- wherein the credit inquiry and the previous credit inquiry are determined to be related if the previous credit inquiry is within a predetermined window of time of the credit inquiry and at least one of the following is true:
  - the credit inquiry and the previous credit inquiry have been deemed to refer to a same creditor; and
  - the credit inquiry and the previous credit inquiry have been deemed to refer to a same credit category, wherein a credit category comprises a classification of a credit product to which a given credit inquiry relates;
- responsive to a determination that the credit inquiry is related to a previous credit inquiry, the computer system suppressing a credit alert to the monitored consumer;
- prior to the performing, for each n-gram type of one or more n-gram types:
- identifying all n-grams of the n-gram type that appear in each creditor name listed in a set of categorized creditors from the master creditor records;
- creating a list of unique n-grams from the identified n-grams;
- counting how many times each unique n-gram appears per credit category, the counting yielding a plurality of n-gram counts for each unique n-gram;
- counting, for each credit category, how many times each unique n-gram appears overall when that credit category is excluded, the counting yielding a plurality of exclusion n-gram counts for each unique n-gram;
- computing a plurality of n-gram scores for each unique n-gram, each n-gram score of the plurality of n-gram scores corresponding to a particular credit category; and
- storing the plurality of n-gram scores for each unique n-gram in an n-gram scoring table.

11. The method of claim 10, wherein the one or more n-gram types comprises an n-gram type of unigram.

12. The method of claim 11, wherein the one or more n-gram types comprises an n-gram type of bigram.

13. The method of claim 12, wherein the performing comprises:
- receiving a provided creditor name;
- identifying each unigram that appears in the provided creditor name;
- acquiring, for each identified unigram, unigram scores by credit category;
- identifying each bigram that appears in the provided creditor name;
- acquiring, for each identified bigram, bigram scores by credit category;
- summing the acquired unigram scores and the acquired bigram scores by credit category, the summing yielding a credit-category score for each credit category;
- for each credit category, comparing the credit-category score to a score threshold;

for each credit category, determining whether the credit-category score exceeds the score threshold;

responsive to a determination that at least one credit-category score exceeds its respective score threshold, determining whether more than one credit-category score exceeds its respective score threshold; and responsive to a determination that only one credit-category score exceeds its respective score threshold, returning a credit category to which the one credit-category score corresponds as an inferred credit category.

14. The method of claim 12, wherein the performing comprises:

responsive to a determination that more than one credit-category score exceeds its respective score threshold, determining whether one credit-category exceeds its respective score threshold by a greater amount than any other credit-category score exceeds its respective score threshold; and responsive to a determination that one credit-category score exceeds its respective score threshold by a greater amount than any other credit-category score exceeds its respective score threshold, returning a credit category to which the one credit-category score corresponds as an inferred credit category.

15. A method comprising:

on a computer system comprising at least one processor and memory, receiving a credit inquiry for a monitored consumer;

performing, by the computer system, at least one credit-inquiry analysis on the credit inquiry;

wherein the performing yields at least one of:
a matched creditor from master creditor records; and
an inferred credit category based on a lexical analysis;

responsive to the performing, the computer system determining whether the credit inquiry is related to a previous credit inquiry for the monitored consumer;

wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor;
the credit inquiry and the previous credit inquiry have been deemed to refer to a same credit category, wherein a credit category comprises a classification of a credit product to which a given credit inquiry relates;

responsive to a determination that the credit inquiry is related to a previous credit inquiry, the computer system suppressing a credit alert to the monitored consumer; and wherein the performing comprises:
performing name matching using a creditor name extracted from the credit inquiry;
responsive to a determination that the name matching was not successful, performing address matching using a creditor address extracted from the credit inquiry;
responsive to a determination that the address matching was not successful, performing a thesaurus lookup using the creditor name; and
responsive to a determination that the thesaurus lookup was not successful, performing a lexical analysis of the creditor name.

16. A method comprising:

on a computer system comprising at least one processor and memory, receiving a credit inquiry for a monitored consumer;

performing, by the computer system, at least one credit-inquiry analysis on the credit inquiry;

wherein the performing yields at least one of:
a matched creditor from master creditor records; and
an inferred credit category based on a lexical analysis;

responsive to the performing, the computer system determining whether the credit inquiry is related to a previous credit inquiry for the monitored consumer;

wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor;
the credit inquiry and the previous credit inquiry have been deemed to refer to a same credit category, wherein a credit category comprises a classification of a credit product to which a given credit inquiry relates;

responsive to a determination that the credit inquiry is related to a previous credit inquiry, the computer system suppressing a credit alert to the monitored consumer; and wherein the performing comprises:
performing name matching using a creditor name extracted from the credit inquiry;
performing address matching using a creditor address extracted from the credit inquiry;
performing a thesaurus lookup using the creditor name;
performing a lexical analysis of the creditor name;
determining whether the name matching, the address matching, the thesaurus lookup, and the lexical analysis yield an agreed-upon match; and
retaining any agreed-upon match.

17. A system comprising:

at least one processor, wherein the at least one processor is operable to perform a method comprising:
receiving a credit inquiry for a monitored consumer;
performing at least one credit-inquiry analysis on the credit inquiry;
wherein the performing yields at least one of:
a matched creditor from master creditor records; and
an inferred credit category based on a lexical analysis;
responsive to the performing, determining whether the credit inquiry is related to a previous credit inquiry for the monitored consumer;
wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor; and
the credit inquiry and the previous credit inquiry have been deemed to refer to a same credit category, wherein a credit category comprises a classification of a credit product to which a given credit inquiry relates; and
responsive to a determination that the credit inquiry is related to a previous credit inquiry, suppressing a credit alert to the monitored consumer;
wherein the performing comprises returning, as a matched creditor, any creditor from the master creditor records whose creditor address is deemed to match a source creditor address;
wherein a target creditor address comprises a target address line and the source creditor address comprises a source address line;

creating a source token set based on the source address line and a target token set based on the target address line;
categorizing each token in the source token set and each token in the target token set into one of a plurality of categories;
filtering the source token set and the target token set;
for each of the source token set and the target token set, combining sequential tokens categorized into a same token category;
normalizing a token format of the source token set and the target token set;
comparing tokens of the source token set to tokens of the target token set;
wherein the comparing of the source creditor address comprises identifying a target creditor address in the master creditor records;
responsive to the comparing of the source token set to the target token set, removing each exact match from the source token set and the target token set; and
responsive to a determination that the source token set and the target token set are empty, identifying the source creditor address and the target creditor address as a match.

18. A computer-program product comprising a non-transitory computer-usable medium having computer-readable program code embodied therein, the computer-readable program code adapted to be executed to implement a method comprising:
receiving a credit inquiry for a monitored consumer;
performing at least one credit-inquiry analysis on the credit inquiry;
wherein the performing yields at least one of:
a matched creditor from master creditor records; and
an inferred credit category based on a lexical analysis;
responsive to the performing, determining whether the credit inquiry is related to a previous credit inquiry for the monitored consumer;
wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor; and
the credit inquiry and the previous credit inquiry have been deemed to refer to a same credit category, wherein a credit category comprises a classification of a credit product to which a given credit inquiry relates; and
responsive to a determination that the credit inquiry is related to a previous credit inquiry, suppressing a credit alert to the monitored consumer;
wherein the performing comprises returning, as a matched creditor, any creditor from the master creditor records whose creditor address is deemed to match a source creditor address;
wherein a target creditor address comprises a target address line and the source creditor address comprises a source address line;
creating a source token set based on the source address line and a target token set based on the target address line;
categorizing each token in the source token set and each token in the target token set into one of a plurality of categories;
filtering the source token set and the target token set;
for each of the source token set and the target token set, combining sequential tokens categorized into a same token category;
normalizing a token format of the source token set and the target token set;
comparing tokens of the source token set to tokens of the target token set;
wherein the comparing of the source creditor address comprises identifying a target creditor address in the master creditor records;
responsive to the comparing of the source token set to the target token set, removing each exact match from the source token set and the target token set; and
responsive to a determination that the source token set and the target token set are empty, identifying the source creditor address and the target creditor address as a match.

19. A system comprising:
at least one processor, wherein the at least one processor is operable to perform a method comprising:
receiving a credit inquiry for a monitored consumer;
performing at least credit-inquiry analysis on the credit inquiry;
wherein the performing yields at least one of:
a matched creditor from master creditor records; and
an inferred credit category based on a lexical analysis;
responsive to the performing, determining whether the credit inquiry is related to a previous credit inquiry for the monitored consumer;
wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor; and
the credit inquiry and the previous credit inquiry have been deemed to refer to a same credit category, wherein a credit category comprises a classification of a credit product to which a given credit inquiry relates;
responsive to a determination that the credit inquiry is related to a previous inquiry, suppressing a credit alert to the monitored consumer;
prior to the performing, for each n-gram type of one or more n-gram types:
identifying all n-grams of the n-gram type that appear in each creditor name listed in a set of categorized creditors from the master creditor records;
creating a list of unique n-grams from the identified n-grams;
counting how many times each unique n-gram appears per credit category, the counting yielding a plurality of n-gram counts for each unique n-gram;
counting, for each credit category, how many times each unique n-gram appears overall when that credit category is excluded, the counting yielding a plurality of exclusion n-gram counts for each unique n-gram;
computing a plurality of n-gram scores for each unique n-gram, each n-gram score of the plurality of n-gram scores corresponding to a particular credit category; and
storing the plurality of n-gram scores for each unique n-gram in an n-gram scoring table.

20. A computer-program product comprising a non-transitory computer-usable medium having computer-readable program code embodied therein, the computer-readable program code adapted to be executed to implement a method comprising:

receiving a credit inquiry for a monitored consumer;
performing at least one credit-inquiry analysis on the credit inquiry;
wherein the performing yields at least one of:
a matched creditor from master creditor records; and
an inferred credit category based on a lexical analysis;
responsive to the performing, determining whether the credit inquiry is related to a previous credit inquiry for the monitored consumer;
wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor; and
the credit inquiry and the previous credit inquiry have been deemed to refer to a same credit category, wherein a credit category comprises a classification of a credit product to which a given credit inquiry relates;
responsive to a determination that the credit inquiry is related to a previous inquiry, suppressing a credit alert to the monitored consumer;
prior to the performing, for each n-gram type of one or more n-gram types:
identifying all n-grams of the n-gram type that appear in each creditor name listed in a set of categorized creditors from the master creditor records;
creating a list of unique n-grams from the identified n-grams;
counting how many times each unique n-gram appears per credit category, the counting yielding a plurality of n-gram counts for each unique n-gram;
counting, for each credit category, how many times each unique n-gram appears overall when that credit category is excluded, the counting yielding a plurality of exclusion n-gram counts for each unique n-gram;
computing a plurality of n-gram scores for each unique n-gram, each n-gram score of the plurality of n-gram scores corresponding to a particular credit category; and
storing the plurality of n-gram scores for each unique n-gram in an n-gram scoring table.

21. A system comprising:
at least one processor, wherein the at least one processor is operable to perform a method comprising:
receiving a credit inquiry for a monitored consumer;
performing at least credit-inquiry analysis on the credit inquiry;
wherein the performing yields at least one of:
a matched creditor from master creditor records; and
an inferred credit category based on a lexical analysis;
responsive to the performing, determining whether the credit inquiry is related to a previous credit inquiry for the monitored consumer;
wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor; and
the credit inquiry and the previous credit inquiry have been deemed to refer to a same credit category, wherein a credit category comprises a classification of a credit product to which a given credit inquiry relates;
responsive to a determination that the credit inquiry is related to a previous inquiry, suppressing a credit alert to the monitored consumer; and
wherein the performing comprises:
performing name matching using a creditor name extracted from the credit inquiry;
responsive to a determination that the name matching was not successful, performing address matching using a creditor address extracted from the credit inquiry;
responsive to a determination that the address matching was not successful, performing a thesaurus lookup using the creditor name; and
responsive to a determination that the thesaurus lookup was not successful, performing a lexical analysis of the creditor name.

22. A computer-program product comprising a non-transitory computer-usable medium having computer-readable program code embodied therein, the computer-readable program code adapted to be executed to implement a method comprising:
receiving a credit inquiry for a monitored consumer;
performing at least one credit-inquiry analysis on the credit inquiry;
wherein the performing yields at least one of:
a matched creditor from master creditor records; and
an inferred credit category based on a lexical analysis;
responsive to the performing, determining whether the credit inquiry is related to a previous credit inquiry for the monitored consumer;
wherein the credit inquiry and the previous credit inquiry are determined to be related if the previous credit inquiry is within a predetermined window of time of the credit inquiry and at least one of the following is true:
the credit inquiry and the previous credit inquiry have been deemed to refer to a same creditor; and
the credit inquiry and the previous credit inquiry have been deemed to refer to a same credit category, wherein a credit category comprises a classification of a credit product to which a given credit inquiry relates;
responsive to a determination that the credit inquiry is related to a previous inquiry, suppressing a credit alert to the monitored consumer; and
wherein the performing comprises:
performing name matching using a creditor name extracted from the credit inquiry;
responsive to a determination that the name matching was not successful, performing address matching using a creditor address extracted from the credit inquiry;
responsive to a determination that the address matching was not successful, performing a thesaurus lookup using the creditor name; and
responsive to a determination that the thesaurus lookup was not successful, performing a lexical analysis of the creditor name.

23. A system comprising:
at least one processor, wherein the at least one processor is operable to perform a method comprising:
receiving a credit inquiry for a monitored consumer;
performing at least credit-inquiry analysis on the credit inquiry;
wherein the performing yields at least one of:
a matched creditor from master creditor records; and
an inferred credit category based on a lexical analysis;

responsive to the performing, determining whether the credit inquiry is related to a previous credit inquiry for the monitored consumer;

wherein the credit inquiry and the previous credit inquiry are determined to be related if the previous credit inquiry is within a predetermined window of time of the credit inquiry and at least one of the following is true:

the credit inquiry and the previous credit inquiry have been deemed to refer to a same creditor; and the credit inquiry and the previous credit inquiry have been deemed to refer to a same credit category, wherein a credit category comprises a classification of a credit product to which a given credit inquiry relates;

responsive to a determination that the credit inquiry is related to a previous inquiry, suppressing a credit alert to the monitored consumer; and wherein the performing comprises:

performing name matching using a creditor name extracted from the credit inquiry;

performing address matching using a creditor address extracted from the credit inquiry;

performing a thesaurus lookup using the creditor name;

performing a lexical analysis of the creditor name;

determining whether the name matching, the address matching, the thesaurus lookup, and the lexical analysis yield an agreed-upon match; and retaining any agreed-upon match.

24. A computer-program product comprising a non-transitory computer-usable medium having computer-readable program code embodied therein, the computer-readable program code adapted to be executed to implement a method comprising:

receiving a credit inquiry for a monitored consumer;

performing at least one credit-inquiry analysis on the credit inquiry;

wherein the performing yields at least one of:

a matched creditor from master creditor records; and an inferred credit category based on a lexical analysis;

responsive to the performing, determining whether the credit inquiry is related to a previous credit inquiry for the monitored consumer;

wherein the credit inquiry and the previous credit inquiry are determined to be related if the previous credit inquiry is within a predetermined window of time of the credit inquiry and at least one of the following is true:

the credit inquiry and the previous credit inquiry have been deemed to refer to a same creditor; and the credit inquiry and the previous credit inquiry have been deemed to refer to a same credit category, wherein a credit category comprises a classification of a credit product to which a given credit inquiry relates;

responsive to a determination that the credit inquiry is related to a previous inquiry, suppressing a credit alert to the monitored consumer; and wherein the performing comprises:

performing name matching using a creditor name extracted from the credit inquiry;

performing address matching using a creditor address extracted from the credit inquiry;

performing a thesaurus lookup using the creditor name;

performing a lexical analysis of the creditor name;

determining whether the name matching, the address matching, the thesaurus lookup, and the lexical analysis yield an agreed-upon match; and retaining any agreed-upon match.

\* \* \* \* \*